United States Patent
Khawand et al.

(10) Patent No.: US 10,630,630 B1
(45) Date of Patent: Apr. 21, 2020

(54) INTELLIGENT LOCK SCREEN NOTIFICATIONS

(71) Applicant: MICROSOFT TECHNOLOGY LICENSING, LLC, Redmond, WA (US)

(72) Inventors: Jean Khawand, Sammamish, WA (US); Paul Wayne Irwin, Everett, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/165,812

(22) Filed: Oct. 19, 2018

(51) Int. Cl.
  *H04M 3/16* (2006.01)
  *H04L 12/58* (2006.01)
  *H04W 4/14* (2009.01)

(52) U.S. Cl.
  CPC .............. *H04L 51/24* (2013.01); *H04W 4/14* (2013.01)

(58) Field of Classification Search
  CPC .................................. H04L 51/24; H04W 4/14
  USPC ........................................................ 455/411
  See application file for complete search history.

(56) References Cited

U.S. PATENT DOCUMENTS

| | | | | |
|---|---|---|---|---|
| 8,752,145 B1* | 6/2014 | Dotan | ................. | H04L 63/0861 340/5.2 |
| 9,888,113 B1* | 2/2018 | Duschl | .............. | H04M 3/42051 |
| 2010/0257490 A1* | 10/2010 | Lyon | ..................... | G06F 3/0488 715/863 |
| 2013/0102281 A1 | 4/2013 | Kanda et al. | | |
| 2015/0332439 A1 | 11/2015 | Zhang et al. | | |
| 2018/0018474 A1 | 1/2018 | Shimizu | | |
| 2018/0270180 A1* | 9/2018 | Chen | ................... | G06F 17/2765 |
| 2019/0050600 A1* | 2/2019 | Sahoo | ................. | G06F 21/6281 |

FOREIGN PATENT DOCUMENTS

WO 2016130466 A1 8/2016

OTHER PUBLICATIONS

"International Search Report and Written Opinion Issued in PCT Application No. PCT/US2019/54690", dated Feb. 17, 2020, 21 Pages.

* cited by examiner

*Primary Examiner* — Marcos Batista
(74) *Attorney, Agent, or Firm* — Newport IP, LLC; Mike R. Cicero

(57) ABSTRACT

A device analyzes text messages, email, and/or other data for the purposes of suppressing the display of sensitive content on a lock screen. For example, a device may prevent a lock screen from displaying a notification indicating the arrival of a message containing sensitive information. Alternatively, the device may filter any sensitive information from a notification indicating the arrival of a message. The techniques disclosed herein improve the security of a device by preventing the display of sensitive information on a lock screen, while also improving the usability of lock screen notifications by allowing other information to be displayed. The techniques disclosed herein also improve the security of other systems using the device as part of a multi-factor authentication process.

20 Claims, 15 Drawing Sheets

INTELLIGENT LOCK SCREEN NOTIFICATIONS

BACKGROUND

Many conventional computing devices, including mobile phones and tablets, are configured to present a "lock screen" when powered on or when transitioned from a power-saving state to a full-power state. The lock screen comprises a visual interface that is displayed before the user has entered a passcode (or supplied some other credential, such as one or more other biometric authentications) that is required to activate the full functionality of the device. If the user cannot supply appropriate credentials, the user cannot get past the lock screen and the device will remain in a locked state or a reduced functionality state.

Since a lock screen can be viewed by anyone having physical or visual access to the device, including unauthorized persons, most existing systems restrict the display of certain types of information while the device is operating in a locked state. For example, the lock screen may only display basic information such as the date and time, a signal reception indicator, a network indicator, and/or a battery status indicator. Likewise, some devices that utilize lock screens typically limit the types of functionality that can be accessed via the lock screen. For example, the lock screen may be used to display received text messages but may prohibit a user from responding to them. In another example, some existing systems can block notifications generated by certain applications from appearing on a lock screen, such as preview notifications of all text messages. However, these all-or-nothing policies can be overly restrictive. Many users find these types of policies to be inconvenient and the usability of such features may not be feasible for some users.

When a device is configured to display a preview of received data, such as all incoming text messages, the device indiscriminately displays the text messages regardless of the content. Even when a device is in a locked state, lock screen notifications revealing sensitive information allow anyone who has physical or visual access to the device to learn this information without providing any sort of credentials (e.g., a password, swipe pattern, fingerprint scan or face scan). If such lock screen notifications reveal sensitive information, the information may present a privacy and/or security risk. Such shortcomings of existing systems can also compromise other security measures, such as a computer system using text messages as part of a two-factor authentication process.

Therefore, there remains a technical need to provide an improved lock screen for computing devices that reduces the likelihood of displaying sensitive information on the lock screen.

SUMMARY

The technologies described herein address the technical need to provide an improved lock screen for computing devices. Specifically, the described implementations provide improved security features over existing systems by selectively suppressing the display of sensitive information on a lock screen based on an analysis of the information and other related data. For example, a device may analyze the content of any incoming message, e.g., a text message or email, and selectively restrict the display of individual messages having content based on one or more criteria. The device may also selectively display other messages having content based on other criteria. In another example, a device may analyze a phone number or another identifier associated with a sender of a received message. The received message may be displayed on, or restricted from display on, a lock screen based on criteria associated with the phone number or identifier.

In some embodiments, a device may determine a degree of content suppression based on an analysis of a received message. A degree of content suppression can enable a device to display a range of different types of notifications with each type of notification suppressing different portions of the message. For example, at a first degree of suppression, a device may suppress the display of sensitive content within a message but display other content of the message. At a second degree of suppression, a device may suppress the display of the entire message and only display an identifier or phone number associated with the message. At a third degree of suppression, a device may suppress the display of the entire message, and only display a general notification that a message was received. At a fourth degree of suppression, a device may prevent the display of any information when a message is received. As will be described below, one or more user settings associated with an application for managing received messages can be used to determine a degree of content suppression.

The techniques disclosed herein provide an enhanced level of security by identifying and suppressing the display of any sensitive content when a device is in a locked state. In addition, the techniques described herein also improve the usability of a device by selectively displaying content that is not deemed to be sensitive. Such features provide advantages over the all-or-nothing policy that is utilized in some existing systems. The techniques disclosed herein can also enhance the security of other systems that send messages to mobile devices as part of a multi-factor authentication process.

The techniques disclosed herein can provide a number of technical benefits over existing systems. In addition to improving security to a device and other systems, the techniques disclosed herein can also improve the power efficiency of one or more devices. For instance, by suppressing the display of sensitive information on a lock screen, consumption of processor resources and overall power resources can be reduced. Other technical benefits can also be realized from implementations of the technologies disclosed herein.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithm(s), hardware logic, and/or operation(s) as permitted by the context described above and throughout the document.

BRIEF DESCRIPTION OF THE DRAWING

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
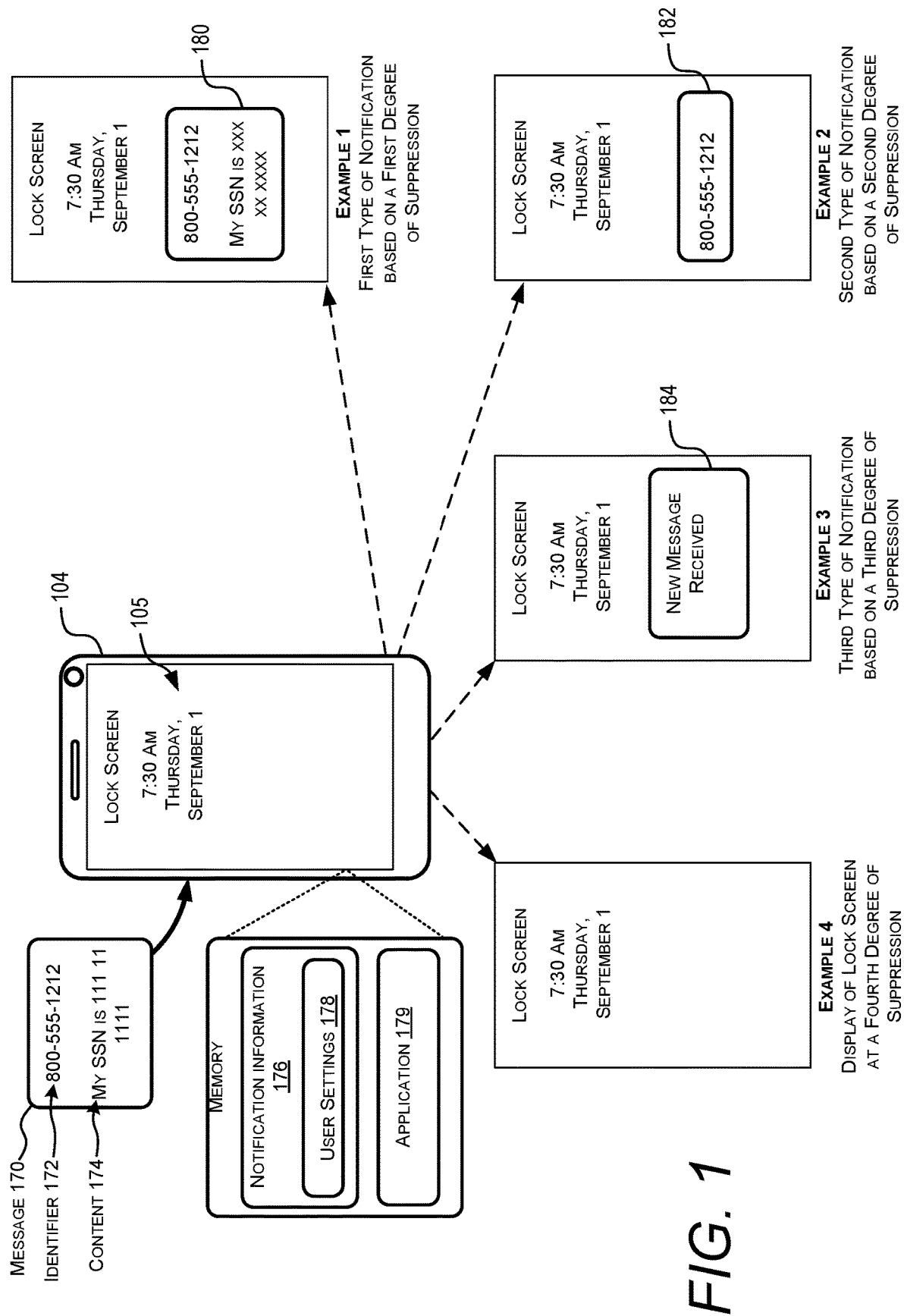
FIG. 1 illustrates different types of message notifications that may be displayed based on a degree of suppression associated with a received message.

FIG. 1 illustrates a device 104 for suppressing the display of sensitive content on a lock screen 105. As shown, the device 104 can receive a message 170 including an identifier 172 and content 174. The identifier 172 can include, for instance, a telephone number or an email address associated with a sender of the message 170. The content 174 can include any data, such as text data, audio data or image data, that is managed by an application 179 executing on the device 104. In this illustrative example, the identifier 172 is a phone number and the content 174 includes a Social Security number and other descriptive text. As will be described in more detail below, the techniques described herein include an analysis of the message 170 and/or user settings 178 to determine if the content 174 includes sensitive information that should be suppressed from being displayed on the lock screen 105 of the device 104.

In some embodiments, the device 104 may obtain notification information 176 that includes one or more user settings 178. The notification information 176 can be in a format that is usable by the application 179 to determine a degree of suppression. The degree of suppression is then used by the device 104 to display certain types of notifications each showing varying amounts of information about the message 170 received by the device 104.

FIG. 1 illustrates an exemplary number of different types of notifications that can be displayed, and different actions that can be executed, based on a selected degree of suppression. In a first example, a first degree of suppression may cause a device to generate a first type of notification 180 that suppresses at least a portion of the content 174. In this example, the notification 180 shows that the Social Security number of the message 170 is hidden, while other portions of the message 170 are displayed on the lock screen 105.

In another example, a second degree of suppression may cause a device to generate a second type of notification 182 that suppresses all of the content 174. As shown, the notification 182 shows that all text associated with the content 174 is suppressed but the notification 182 displays the identifier 172.

In yet another example, a third degree of suppression may cause a device to generate a third type of notification 184 that displays a general message. As shown, the notification 184 shows that all portions of the message 170, including the identifier 172 and the content 174, are suppressed. In this example, the notification 184 indicates that a new message has been received.

Finally, a fourth degree of suppression may cause a device to completely suppress display of any type of notification associated with the message 170. In such examples, the degree of suppression may also control a volume level of an audible notification, change the appearance, e.g., color or level of brightness, of a light-based indicator, or alter the appearance of a background (e.g., background color or image) or brightness level of the lock screen 105.

These examples are provided for illustrative purposes and are not to be construed as limiting. It can be appreciated that the device 104 may perform other types of actions based on a degree of suppression, actions which may include changing a sound or changing properties of other types of light-emitting indictors. Other actions that are based on a degree of suppression can also include other combinations or portions of the identifier 172 and/or the content 174. Additional or fewer degrees of suppression may also be implemented by the computing device 104.

A degree of suppression can be determined using a number of techniques utilizing different types of data. As will be described in more detail below, a degree of suppression can be determined by one or more user settings 178, an analysis of a message 170, user history information, and/or an analysis of machine learning data.

In one illustrative example, a degree of suppression can be based on user settings 178. In such embodiments, the user settings 178 of a device 104 can define different types of notifications, and each type of notification can be associated with a degree of suppression. Thus, when a particular degree of suppression is selected, the device 104 displays a particular type of notification that suppresses a predetermined amount of information each time a message 170 is received. Such an embodiment can be performed without an analysis of the message 170.

In another illustrative example, a degree of suppression can be based on user settings 178 and an analysis of a message 170. In such an embodiment, a device 104 can determine if a message 170 includes sensitive content, e.g., specific keywords, codes, etc. If it is determined that the message 170 includes sensitive content, the device 104 can select a degree of suppression based on the user settings 178. If it is determined that the message 170 does not include sensitive content, a standard notification can be displayed on the lock screen 105. Thus, in such embodiments, one or more user settings 178 may be utilized to select a degree of suppression when sensitive content is detected. Other techniques for identifying the presence of sensitive content are described in more detail below, some of which include the use of contact lists, user history information, and machine learning data.

In other embodiments, user settings 170 can define parameters indicating types of content 170 that should be deemed as sensitive. In such an embodiment, the user settings 178 can define select content, such as keywords, codes, phone numbers, email addresses, or other parameters defining a particular type of content. The user settings 178 can also associate the select content with a particular degree of suppression. A device 104 can then analyze a message 170 to determine if the message 170 includes the select content. When the device 104 detects the presence of the select content within a message 170, the device 104 can select a degree of suppression associated with the select content.

Figure 2:
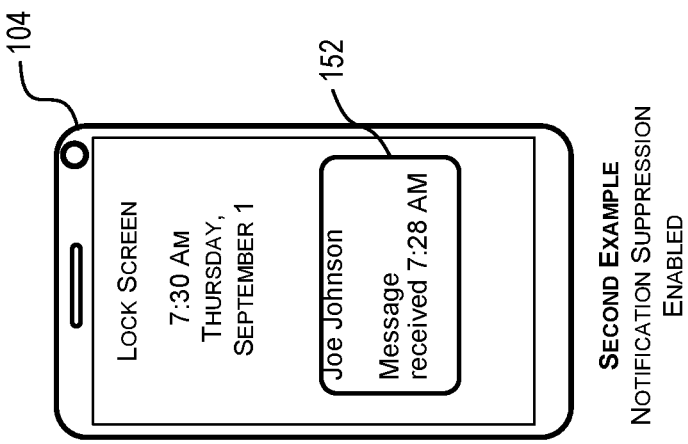
FIG. 2 illustrates one example scenario involving an unsuppressed notification showing the display of a message and a suppressed notification only showing an identifier of a sender of the message.
Figure 2:
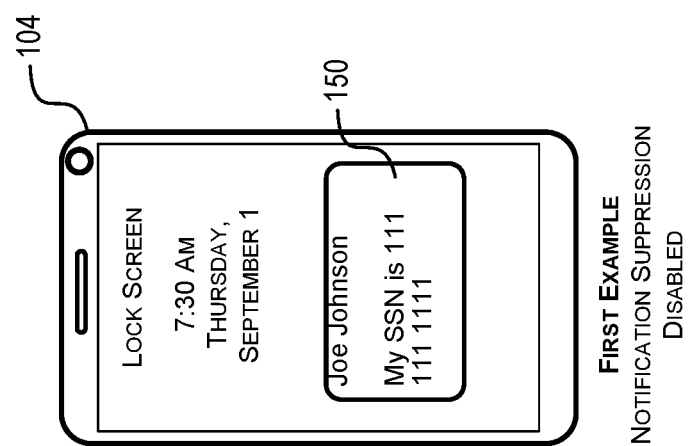
Figure 3:
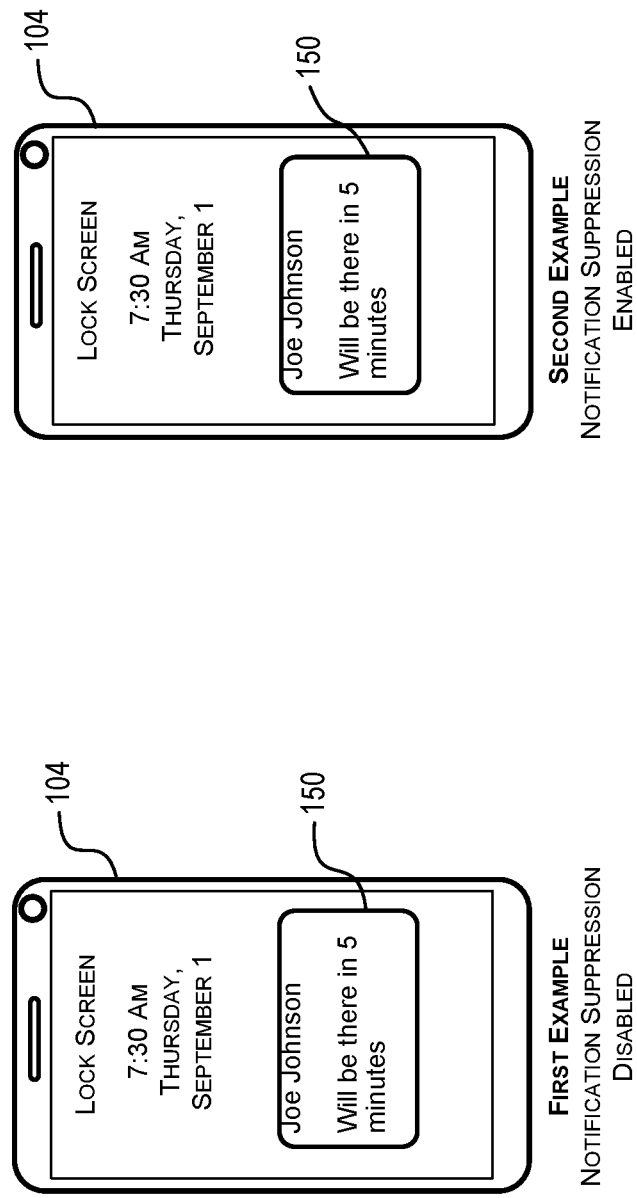
FIG. 3 illustrates another example scenario involving an unsuppressed notification showing the display of a message and a suppressed notification showing the contents of the message that was not deemed as sensitive content.
Figure 4:
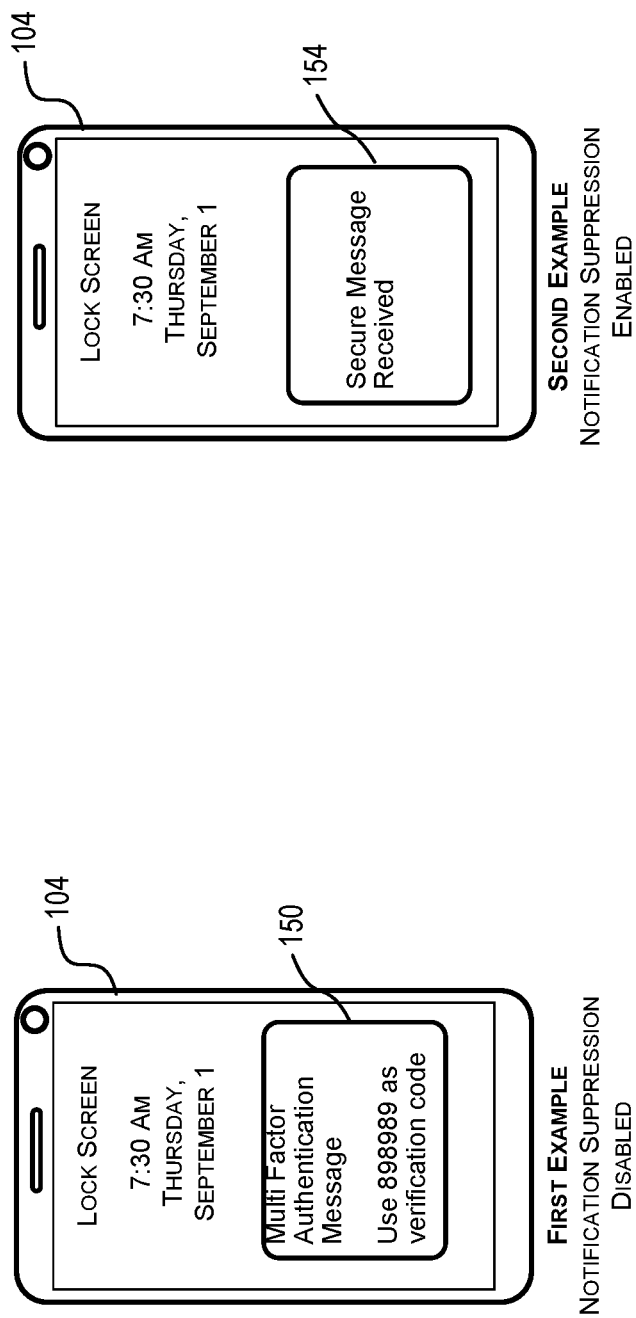
FIG. 4 illustrates another example scenario involving an unsuppressed notification showing the display of a message containing multi-factor authentication information and suppressed notification only showing that a secure message was received.
Figure 5:
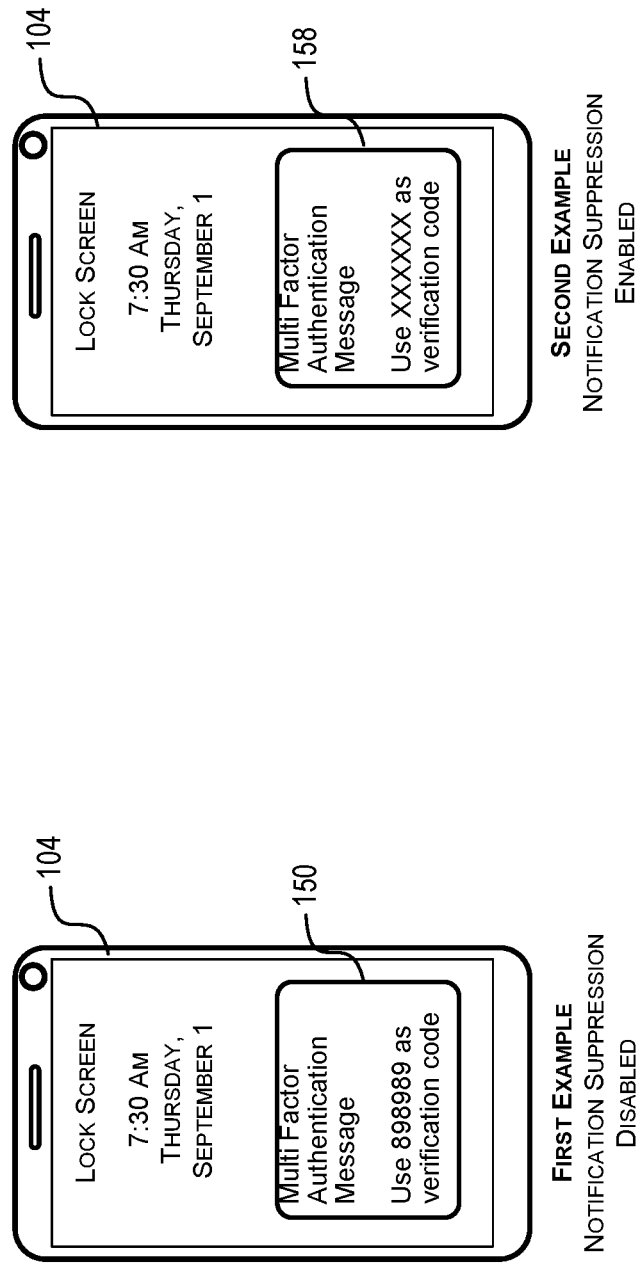
FIG. 5 illustrates another example scenario involving an unsuppressed notification showing the display of a message containing multi-factor authentication information and a suppressed notification showing a portion of a message while suppressing the display of the multi-factor authentication information.

To illustrate aspects of the embodiments described above, FIGS. 2-5 depict other examples of different types of notifications that may be displayed on the lock screen 105 of the device 104. Briefly described, FIG. 2 illustrates one example of a notification that displays an identifier associated with the sender of a message and a timestamp. FIG. 3 illustrates an example of a notification that may be displayed when a message does not contain sensitive content. FIG. 4 illustrates one example of a notification that provides a general description about sensitive content received in a message. FIG. 5 illustrates another example of a notification that provides a more detailed description about sensitive content received in a message.

FIG. 2 shows an example scenario involving a message containing sensitive content. In this example, the device 104 displays different types of notifications based the user settings. In the first example depicted on the left, the device 104 detects user settings indicating that a notification suppression feature is disabled. When a message is received, the contents and an identifier associated with the message are displayed in an unfiltered notification 150. Conversely, in the second example depicted on the right, the device 104 detects user settings indicating that the notification suppression feature is enabled. When a message is received, an identifier and a timestamp associated with the message are displayed in a filtered notification 152.

FIG. 3 shows an example scenario involving a message that does not contain sensitive content. In this example, the device 104 displays the same notification 150 even when the user settings indicate that the notification suppression feature is enabled. A device 104 can generate such results by an analysis of the message. When the device 104 determines that the message does not contain sensitive content, the device 104 does not suppress the display of the message contents on the lock screen.

FIG. 4 illustrates an example scenario involving a message containing multi-factor authentication information. In this example, the device 104 analyzes user settings and the message contents. In the first example depicted on the left, the device 104 detects user settings indicating that a notification suppression feature is disabled. When a message is received, the contents and an identifier associated with the message are displayed in an unfiltered notification 150. Conversely, in the second example depicted on the right, the device 104 detects user settings indicating that the notification suppression feature is enabled. When a message is received, text describing the message is displayed in a filtered notification 154.

FIG. 5 illustrates an example similar to the scenario depicted in FIG. 4. In this example, message containing multi-factor authentication information. When the notification suppression feature is disabled, the device 104 displays an unfiltered notification 150. When the notification suppression feature is enabled, the device analyzes the content of the message to identify the sensitive content and generates a notification 158 that suppresses the display of the multi-factor authentication information. In particular, the notification 158 shows that the verification code has been redacted.

Figure 6:
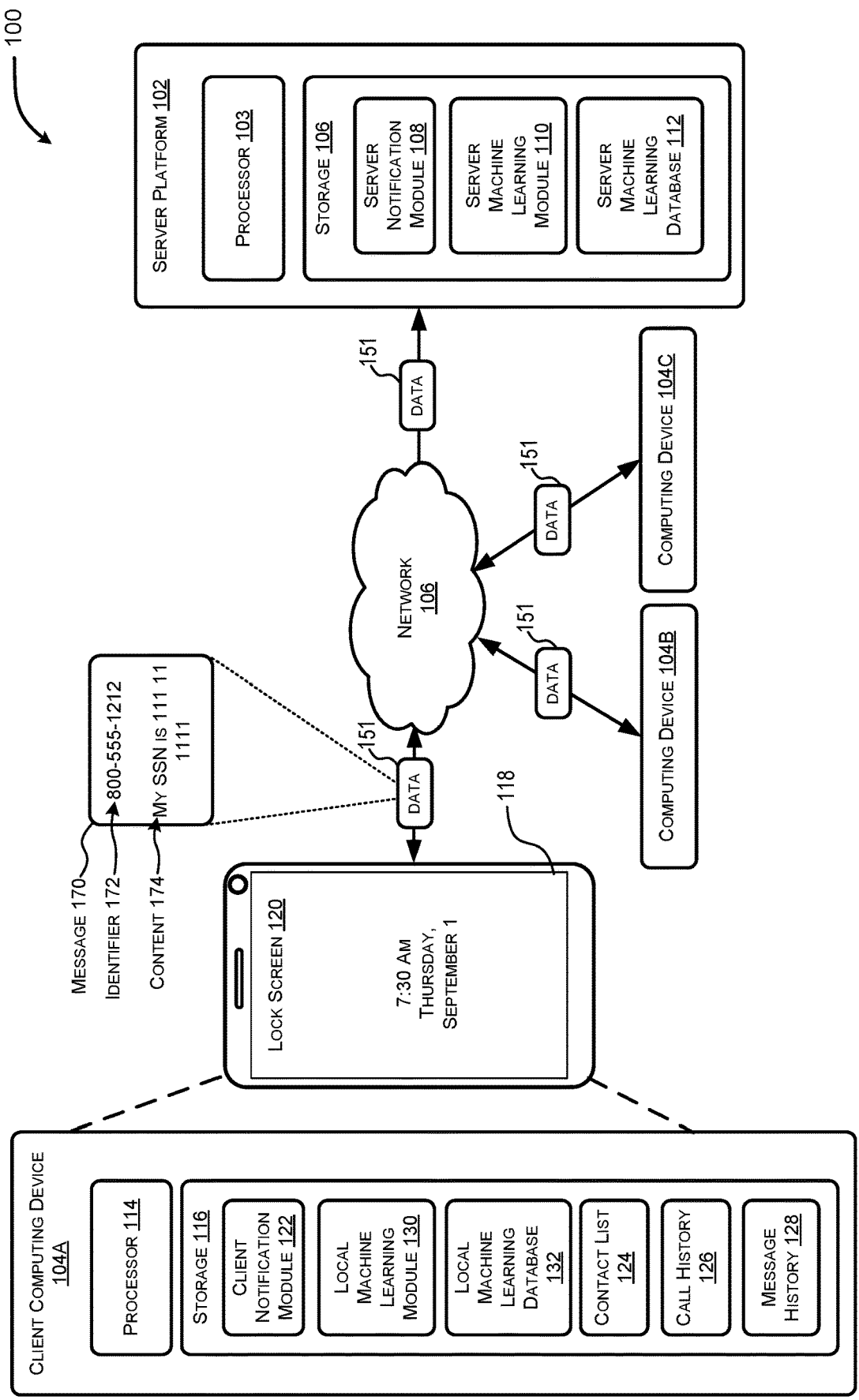
FIG. 6 is a block diagram illustrating an example computing environment that may include computing devices associated with technologies used to suppress communication notifications that may include sensitive content.

FIG. 6 illustrates an example system 100 that is suitable for implementing the technologies described herein. The system includes a number of devices 104A-104C and at least one server platform 102. The server platform 102 and devices 104A-104C that can exchange communication data 151 with one another via a network 106. The communication data 151 can include a message 170 having an identifier 172 and content 174. While the following description often refers to a single computing device 104, it is to be understood that each of the computing devices 104A-104C may include each of the functional elements described in relation to the single computing device 104 referenced in the following.

The network 106 can be a variety of different networks, including the Internet, a local area network (LAN), a wide area network (WAN), a personal area network, a cellular or other phone network, an intranet, other public and/or proprietary networks, combinations thereof, and so forth. It should be noted that the network 106 can be configured to include multiple networks.

The devices 104 can be a variety of different types of devices. For example, in the system 100 each of the devices 104 may be one of a laptop or netbook computer device, a cellular or other wireless phone (e.g., a smartphone) device, a tablet or notepad computer, a printer, a desktop computer, a television or any other suitable computing device.

The server platform 102 (which might be referred to simply as "the platform 102") provides one or more services that can be accessed by the devices 104 via the network 106. The server platform 102 is implemented using one or more of a variety of different types of devices, including a server, a pool of networked servers, a server farm, or any other suitable distributed or co-located server computers.

The server platform 102 may include a processor 103 and a storage 106. The storage 106 may include one or more modules for storing computer executable instructions. The computer executable instructions may be associated with an application, such as an OS and/or one or more end user programs. The processor 103 may execute the computer executable instructions to implement the techniques disclosed herein.

The modules associated with the storage 106 may include a server notification module 108 and a server machine learning module 110. Furthermore, the storage 106 may include a server machine learning database 112. The server notification module 108 may analyze communication data 151 to determine if the communication data 151 includes sensitive content, such as sensitive content included in private messages. For example, the server notification module 108 may analyze communication data 151 received from one or more of the computing devices 104. The communication data 151 received from the one or more of the computing devices 104 may be in the form of text messages, email, or any other communication data 151 that includes text and other content. The communication data 151 may be associated with private messages or public messages. The communication data 151 received by the server platform 102 may be for transmission to one or more of the computing devices 104.

In some implementations, the server notification module 108 analyzes communication data 151 to determine if one or more predetermined privacy terms or alphanumeric data are associated with the communication data 151. The one or more predetermined privacy terms, alphanumeric data, content, text, and the like, may be stored in the server machine learning database 112. Therefore, the server notification module 108 may reference the database 112 to determine if one or more predetermined privacy terms or alphanumeric data are associated with the communication data 151.

In some implementations, the server notification module 108 analyzes communication data 151 to determine if the communication data 151 includes a privacy indicator, such as a privacy flag, enabled to indicate that the communication data 151 includes sensitive content.

The server notification module 108 may communicate or transmit communication data 151 to one of the devices 104 subsequent to analyzing the communication data 151 to determine if the communication data 151 includes sensitive content. When the server notification module 108 determines that the communication data 151 includes sensitive content, the server notification module 108 may include an instruction with the transmitted communication data 151 to one of the devices 104 indicating that the device 104 receiving the communication data 151 is to suppress display of the sensitive content on a lock screen associated with the device 104.

In response to receiving such a sensitive content suppression instruction, the device 104 may suppress display of the sensitive content on the lock screen associated with a device 104. For example, in one implementation, the device 104 may suppress the display of the sensitive content by blocking display of a notification of the received communication data 151 on the lock screen. In another implementation, the device 104 may suppress the display of the sensitive content by providing a notification of the communication data 151 that is devoid of the sensitive content.

The server machine learning module 110 is functional to analyze communication data 151 from one or more of the devices 104. Specifically, the module 110 may analyze communication data 151 for sensitive content associated with a private message. In some implementations, the module 110 may recognize that the communication data 151 received from one or more of the devices 104 includes sensitive content, such as text or terms indicating that the communication data 151 includes sensitive content. The module 110 may store the text or terms in the server machine learning database 112.

The analysis performed by the server machine learning module 110 may also be functional to recognize that certain phone numbers associated with received communication data 151 may indicate that the associated communication data 151 includes sensitive content. For example, the server machine learning module 110 may be programmed to recognize that communication data 151 transmitted from phone numbers including a predetermined number of digits may include sensitive content. The server machine learning module 110 may function cooperatively with the server notification module 108 to notify one or more of the devices 104 that communication data 151 includes sensitive content based on a phone number associated with the communication data 151. The server machine learning module 110 may cause the storage of phone numbers, such as phone numbers having digits less than or greater than 10 digits, in the server machine learning database 112.

The machine learning module 110 may be used to improve and/or augment any and all aspects of the sensitive content recognition techniques disclosed herein. For example, the machine learning module 110 could be used to help better identify potentially sensitive content, and/or to help improve recognition of the types of communication data 151 that includes sensitive content, among other possibilities. Further, machine learning associated with the machine learning module 110 may be utilized to improve the identification of sensitive content for an individual user, across groups of users, and/or across all users of a system, and the suppression of notifications or the use of particular types of notifications associated with content that is determined to be sensitive.

Different machine learning mechanisms may be utilized. For example, a classification mechanism may be utilized to identify the presence of sensitive content. The classification mechanism may classify the display elements into different categories that provide an indication of whether content is to be displayed, not displayed, or if a filtered notification is to be displayed. In other examples, a statistical mechanism may be utilized to identify the presence of sensitive content. For example, a linear regression mechanism may be used to generate a score that indicates a likelihood that a received message contains sensitive information. Linear regression may refer to a process for modeling the relationship between one variable with one or more other variables, such as a score indicating a level of sensitivity. Different linear regression models might be used to calculate the score. For example, a least squares approach might be utilized, a maximum-likelihood estimation might be utilized, or another approach might be utilized.

The computing device 104 may include a processor 114 and a storage 116. Furthermore, the storage 116 may include a plurality of modules. The modules may be implemented as computer executable instructions. The computer executable instructions may be associated with an application, such as the OS and/or an end user program. The processor 114 may execute the computer executable instructions associated with the storage 116 to enable functionalities associated with the computer executable instructions. Furthermore, the devices 104 may include a display screen 118.

The display screen 118 may be functional to display a lock screen 120. The lock screen 120 comprises a visual interface that is displayed before the user has entered a passcode (or supplied some other credential, such as via one or more other biometric authentication credentials) that is required to activate the full functionality of the computing device. If the user is unable to supply the appropriate credential, the user cannot get past the lock screen 120 and the device and OS will remain in a locked state or reduced functionality state. The lock screen 120 is at least functional to display notifications, in cooperation with an application associated with the device 104.

The storage 116 of the device 104 includes a client notification module 122. The client notification module 122 may generate notifications for display on the lock screen 120. In some implementations, the client notification module 122 analyzes communication data 151, such as text messages, email, and/or other data, to ascertain if the communication data 151 includes sensitive content. The communication data 151 may have been communicated by the server platform 102, another device 104, and/or a combination of the server platform 102 and at least one other device 104.

Identification of sensitive content by the client notification module 122 may cause the client notification module 122 to suppress the generation and display, on the lock screen 120, of notifications associated with communication data 151 that includes the identified sensitive content. Alternatively, when the client notification module 122 identifies that the communication data 151 includes sensitive content, the client notification module 122 may generate a notification for display on the lock screen 120 that suppresses the sensitive content.

The storage 116 may include a contact list 124. The contact list 124 may include a list of contacts (e.g., individual entries, business entries, etc.) that a user of the device 104 has saved in the storage 116 and/or a distributed storage (not illustrated on FIG. 6), such as contact lists associated with the server platform 102 and accessible by the device 104. The client notification module 122 may analyze communication data 151 received by the device 104 to determine if a sender or transmitter of the communication data 151 is included in the contact list 124. In some implementations, the client notification module 122 will determine whether the communication data 151 includes sensitive content when a contact entry of the sender or transmitter of the communication data 151 is found in the contact list 124. In other implementations, the client notification module 122 will determine whether the communication data 151 includes sensitive content when a contact entry of the sender or transmitter of the communication data 151 is not found in the contact list 124. The client notification module 122 may search the contact list 124 using a sender's name, email address, phone number, or the like, associated with the communication data 151, to determine if a contact entry of the sender or transmitter of the communication data 151 is found in the contact list 124.

In some implementations, identification of sensitive content by the client notification module 122, based on a search of the contact list 124, may cause the client notification module 122 to suppress the generation and display, on the lock screen 120, of a notification that the communication data 151 was received. Alternatively, the client notification module 122 may generate a notification that is devoid of sensitive content. The notification that communication data 151 is devoid of sensitive content may be displayed on the lock screen 120 in cooperation with the client notification module 122.

The storage 116 may include a call history 126. The call history 126 may include a list of phone numbers associated with outgoing calls by the device 104 and/or incoming calls received by the device 104. The call history 126 may be saved locally in the device 104 and/or the call history 126 may be saved in the storage 116 and/or a distributed storage (not illustrated on FIG. 6), such as the call history associated with the server platform 102.

The client notification module 122 may analyze communication data 151 received by the device 104 to determine if a telephone number associated with a sender or transmitter of the communication data 151 is included in the call history 126. In some implementations, the client notification module 122 will determine whether the communication data 151 includes sensitive content when a telephone number associated with the sender or transmitter of the communication data 151 is found in the call history 126. In other implementations, the client notification module 122 will determine whether the communication data 151 includes sensitive content when a telephone number associated with the sender or transmitter of the communication data 151 is not found in the call history 126.

In some implementations, identification of sensitive content by the client notification module 122, based on a search of the call history 126, may cause the client notification module 122 to suppress the generation and display, on the lock screen 120, of a notification that the communication data 151 was received. Alternatively, the client notification module 122 may generate a notification that is devoid of sensitive content. The notification that is devoid of sensitive content may be displayed on the lock screen 120 in cooperation with the client notification module 122.

The storage 116 may also include a message history 128. The message history 128 may include a list of phone numbers associated with outgoing text messages by the device 104 and/or incoming text messages received by the device 104. The message history 128 may further or alternatively include one or more email addresses associated with outgoing communications by the computing device 104 and/or incoming communications received by the computing device 104. The message history 128 may be saved locally in the device 104 and/or the message history 128 may be saved in the storage 116 and/or a distributed storage (not illustrated on FIG. 6), such as message history associated with the server platform 102.

The client notification module 122 may analyze communication data 151 received by the device 104 to determine if a telephone number and/or email address associated with a sender or transmitter of the communication data 151 is included in the message history 128. In some implementations, the client notification module 122 will determine whether the communication data 151 includes sensitive content when a telephone number and/email address associated with the sender or transmitter of the communication data 151 is found in the message history 128. In other implementations, the client notification module 122 will determine whether the communication data 151 includes sensitive content when a telephone number and/or email address associated with the sender or transmitter of the communication data 151 is not found in the message history 128.

In some implementations, identification of sensitive content by the client notification module 122, based on a search of the message history 128, may cause the client notification module 122 to suppress the generation and display, on the lock screen 120, of a notification that the communication data 151 was received. Alternatively, the client notification module 122 may generate a notification that is devoid of sensitive content. The notification that is devoid of sensitive content may be displayed on the lock screen 120 in cooperation with the client notification module 122.

The device 104 further includes a local machine learning module 130 and a local machine learning database 132. In some implementations, the local machine learning module 130 functions cooperatively with the client notification module 122 as part of a process to identify communication data 151 that includes sensitive content. In some implementations, the client notification module 122 may access information and data stored in the local machine learning database 132 to ascertain if communication data 151 includes sensitive content.

The local machine learning module 130 may interface with the client notification module 122 to observe when the client notification module 122 identifies communication data 151 that includes sensitive content. Alternatively, or in addition, the client notification module 122 may communicate with the local machine learning module 130 when the module 122 identifies communication data 151 that includes sensitive content.

For example, the local machine learning module 130 may be functional to cause the storage, within the local machine learning database 132, of contact related information (e.g. telephone numbers, email addresses, and the like) associated with communication data 151 that the client notification module 122 determined included associated sensitive content. The stored contact related information may be searched by the client notification module 122 as part of a process of determining if communication data 151 includes sensitive content. Furthermore, in some implementations, the local machine learning module 130 may provide such contact related information to the server platform 102 for storage in the server machine learning database 112.

In some implementations, the local machine learning database 132 may include data, such as a plurality of words, terms, images, alphanumeric data and/or text, that may be associated with sensitive content. The client notification module 122 may search the local machine learning database 132 to determine if communication data 151 includes sensitive content. Specifically, the client notification module 122 may compare the words, terms, images, alphanumeric data and/or text associated with communication data 151 to the data stored in the machine learning database 132 to determine if the communication data 151 includes sensitive content. A threshold number of words, terms, alphanumeric data, images and/or text associated with communication data 151 that match data stored in the machine learning database 132 may cause the client notification module 122 to determine that the communication data 151 includes sensitive content.

In some implementations, identification of sensitive content by the client notification module 122, based on the search of the machine learning database 132, may cause the client notification module 122 to suppress the generation and display, on the lock screen 120, of a notification that the communication data 151 was received. Alternatively, the client notification module 122 may generate a notification that is devoid of sensitive content. The notification that is devoid of sensitive content may be displayed on the lock screen 120 in cooperation with the client notification module 122.

In some implementations, the local machine learning database 132 receives data, such as words, terms, alphanumeric data, images and/or text, that may be identifiable with sensitive content from the server platform 102. Specifically, the server platform 102 may access the server machine learning database 112 to retrieve and supply the data that may be identifiable as containing sensitive content. The data stored in the server machine learning database 112 may be augmented by an entity maintaining the server platform 102 and/or the data stored in the server machine learning database 112 may be augmented by data received from computing devices (e.g., devices 104) that interface with the server platform 102 from time to time.

Figure 7:
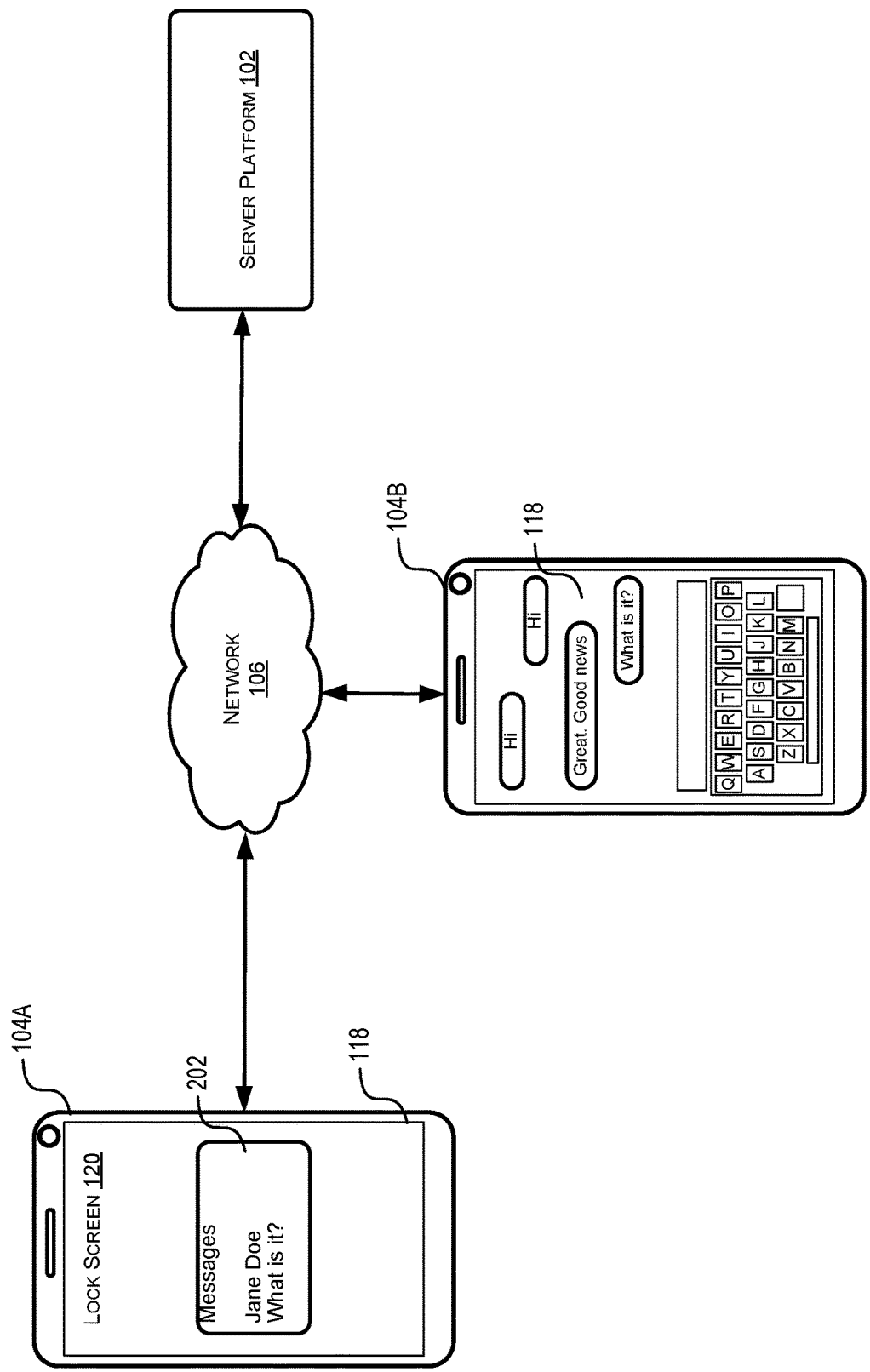
FIG. 7 illustrates one example of an unsuppressed notification showing the display of a message.

FIG. 7 illustrates communication associated with a plurality of devices 104A and 104B to illustrate the sensitive content determination techniques described herein. The display screen 118 associated with the device 104B shows an exemplary communication thread between the devices 104A and 104B.

The most recent text message transmitted by the computing device 104B to the computing device 104A includes the text message "What is it?". The text message may be associated with communication data that includes the text "What is it?", as well as other information including the telephone number, email address, or the like, associated with the computing device 104B.

The computing device 104A is in a locked state when the text message "What is it?" is received by the device 104A. Therefore, in advance of displaying the text message (e.g., a notification) received by the device 104A, the client notification module 122 associated with the device 104A analyzes the communication data associated with the text message "What is it?" to determine if sensitive content is associated with the communication data. As described in the foregoing, the device 104A may reference the local machine learning database 132, the server machine learning database 112, the contact list 124, the call history 126, and/or the message history 128 in determining whether the communication data that includes the text "What is it?" includes sensitive content.

The analysis performed by the computing device 104A indicates that the communication data associated with the text message "What is it?" does not include sensitive content. Therefore, the client notification module 122 associated with the device 104A generates a notification 202 that includes the text message "What is it?".

Figure 8:
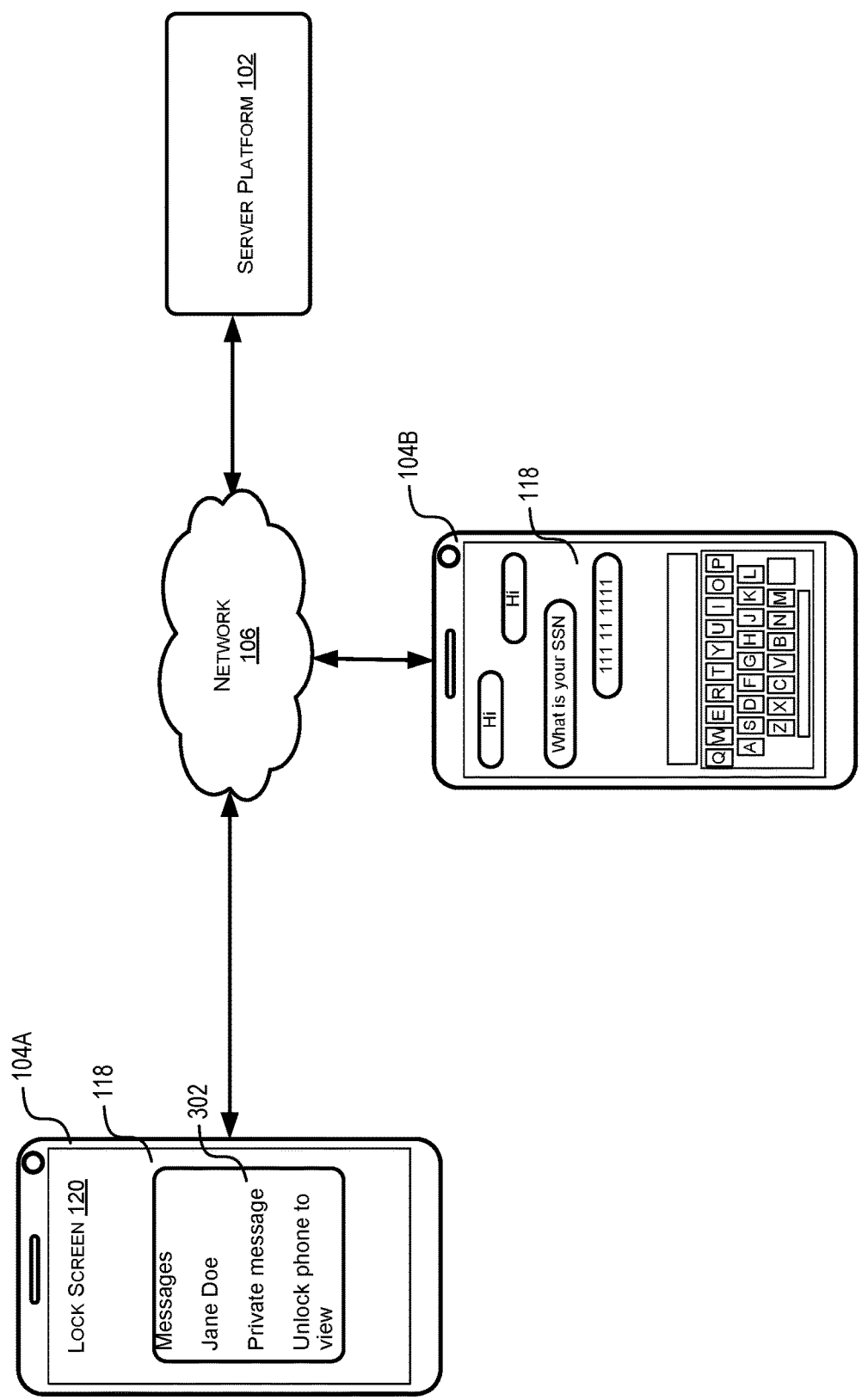
FIG. 8 illustrates one example of a suppressed notification showing that a private message was received by a computing device.

FIG. 8 illustrates communication associated with a plurality of devices 104A and 104B to illustrate the sensitive content determination techniques described herein. The display screen 118 associated with the computing device 104B shows an exemplary communication thread between the computing device 104A and 104B.

The most recent text message transmitted by the computing device 104B to the computing device 104A includes the text message "111 11 1111". The text message may be associated with communication data that includes the text "111 11 1111", as well as other information including the telephone number, email address, or the like, associated with the computing device 104B.

The computing device 104A is in a locked state when the text message "111 11 1111" is received by the computing device 104A. Therefore, in advance of displaying the text message (e.g., a notification) received by the computing device 104A, the client notification module 122 associated with the computing device 104A analyzes the communication data associated with the text message "111 11 1111" as well as prior text messages in the thread to determine if sensitive content is associated with the communication data. As described in the foregoing, the computing device 104A may reference the local machine learning database 132, the server machine learning database 112, the contact list 124, the call history 126, and/or the message history 128 in determining if the communication data that includes the text "111 11 1111" as well as prior text messages in the thread include sensitive content.

The analysis performed by the device 104A indicates that the communication data associated with the text message thread with device 104B includes sensitive content (e.g., the term "SSN" and/or the SSN "111 11 1111"). Therefore, the client notification module 122 associated with the device 104A generates a notification 302 on the device 104A that is devoid of the sensitive content. Alternatively, in some implementations, the client notification module 122 may suppress the generation of a notification for display on the lock screen 120.

Figure 9:
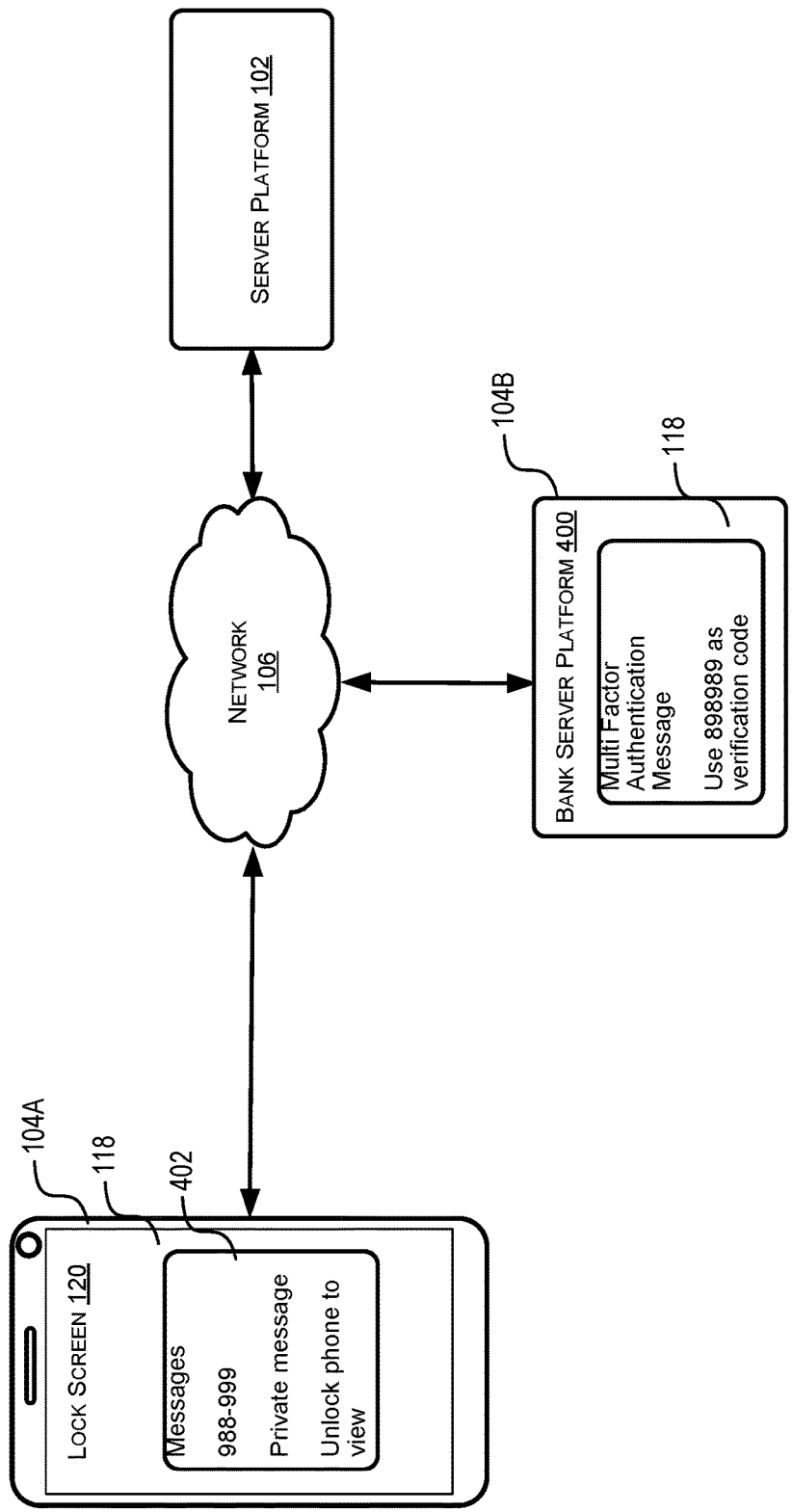
FIG. 9 illustrates an example of a suppressed notification showing a portion of a message while suppressing the display of the multi-factor authentication information.

FIG. 9 illustrates communication associated with a plurality of devices 104A and 104B to illustrate the sensitive content determination techniques described herein. The display screen 118 associated with the device 104B shows an exemplary communication between the devices 104A and 104B. In the exemplary illustration of FIG. 9, the computing device 104B is associated with a bank server platform 400. Specifically, the bank server platform 400 is transmitting a multi-factor authentication message to the device 104A. The multi-factor authentication message includes a verification code "898989". The multi-factor authentication message is being sent using phone number "988-999".

The device 104A is in a locked state when the message from the device 104B associated with the multi-factor authentication message is received by the computing device 104A. Therefore, in advance of displaying the message (e.g., a notification) received by the device 104A, the client notification module 122 associated with the device 104A analyzes the communication data associated with the multi-factor authentication message to determine if sensitive content is associated with the communication data. As described in the foregoing, the device 104A may reference the local machine learning database 132, the server machine learning database 112, the contact list 124, the call history 126, and/or the message history 128 to determine whether the communication data associated with the multi-factor authentication message includes sensitive content.

The analysis performed by the device 104A indicates that the communication data associated with the multi-factor authentication message includes sensitive content. Specifically, analysis performed by the device 104A indicates that the message was transmitted using a telephone number that is less than 10 digits. This analysis result alone may indicate that the communication data includes sensitive content. Furthermore, analysis performed by the device 104A indicates that the message includes the text "verification code". Also, this analysis result alone may indicate that the communication data includes sensitive content. Therefore, the client notification module 122 associated with the device 104A generates a notification 402 that is devoid of the sensitive content. Alternatively, in some implementations, the client notification module 122 may suppress the generation of any notification for display on the lock screen 120.

In some implementations, the analysis performed by the device 104A and/or the server platform 102 may include analyzing the telephone number associated with the message, analyzing the content associated with the message, and/or any other attribute associated with communication data. The analysis performed by the device 104A and/or the server platform 102 may contribute to a calculated score usable in determining if the communication data includes sensitive content. For example, the calculated score may be compared against a baseline or predetermined sensitive content score to determine if the communication data includes sensitive content. In some implementations, when the calculated score is higher than the baseline or predetermined sensitive content score, the communication data associated with a multi-factor authentication message is deemed to include sensitive content.

Figure 10:
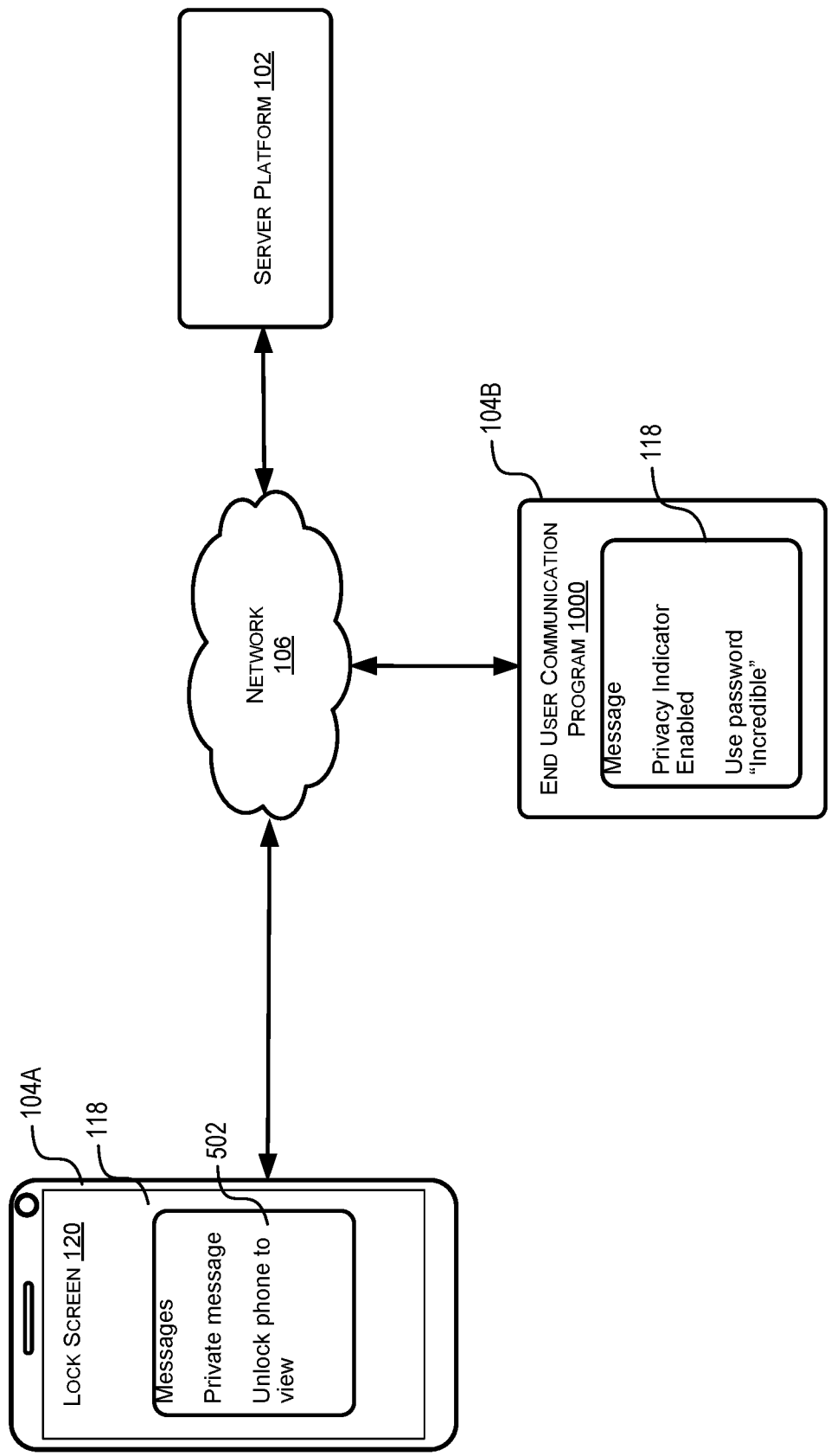
FIG. 10 illustrates an example of a suppressed notification showing a private message suppressing the display of a message that included password information.

FIG. 10 illustrates communication associated with a plurality of devices 104A and 104B to illustrate the sensitive content determination techniques described herein. The display screen 118 associated with the computing device 104B shows an exemplary communication between the devices 104A and 104B. In the exemplary illustration of FIG. 10, the device 104B is associated with an end-user communication program 1000. The end user communication program 900 may be an email application, text messaging application, voice and/or video messaging application, and the like.

The communication program 1000 is transmitting a private message from the device 104B to the computing device 104A. The private message to the computing device 104A includes an enabled privacy indicator. The enabled privacy indicator may be in the form of a user selectable privacy flag that is recognizable by a computing device implementing the described sensitive content recognition and suppression techniques. In some embodiments, the user settings 178 illustrated on FIG. 1 can include the privacy indicator.

The computing device 104A is in a locked state when the private message is received by the computing device 104A. In advance of displaying the message (e.g., a notification) received by the computing device 104A, the client notification module 122 associated with the computing device 104A analyzes the communication data associated with the message to determine if sensitive content is associated with the communication data. As described in the foregoing, the computing device 104A may reference the local machine learning database 132, the server machine learning database 112, the contact list 124, the call history 126, and/or the message history 128 in deciding if the communication data associated with the message includes sensitive content.

The analysis performed by the computing device 104A indicates that the communication data associated with the message includes sensitive content. Specifically, analysis performed by the computing device 104A indicates that the message includes an enabled privacy indicator. Therefore, the client notification module 122 associated with the device 104A generates a notification 502 that does not include the content associated with the message transmitted by the device 104B. Alternatively, in some implementations, the client notification module 122 may suppress the generation of a notification for display on the lock screen 120.

Figure 11:
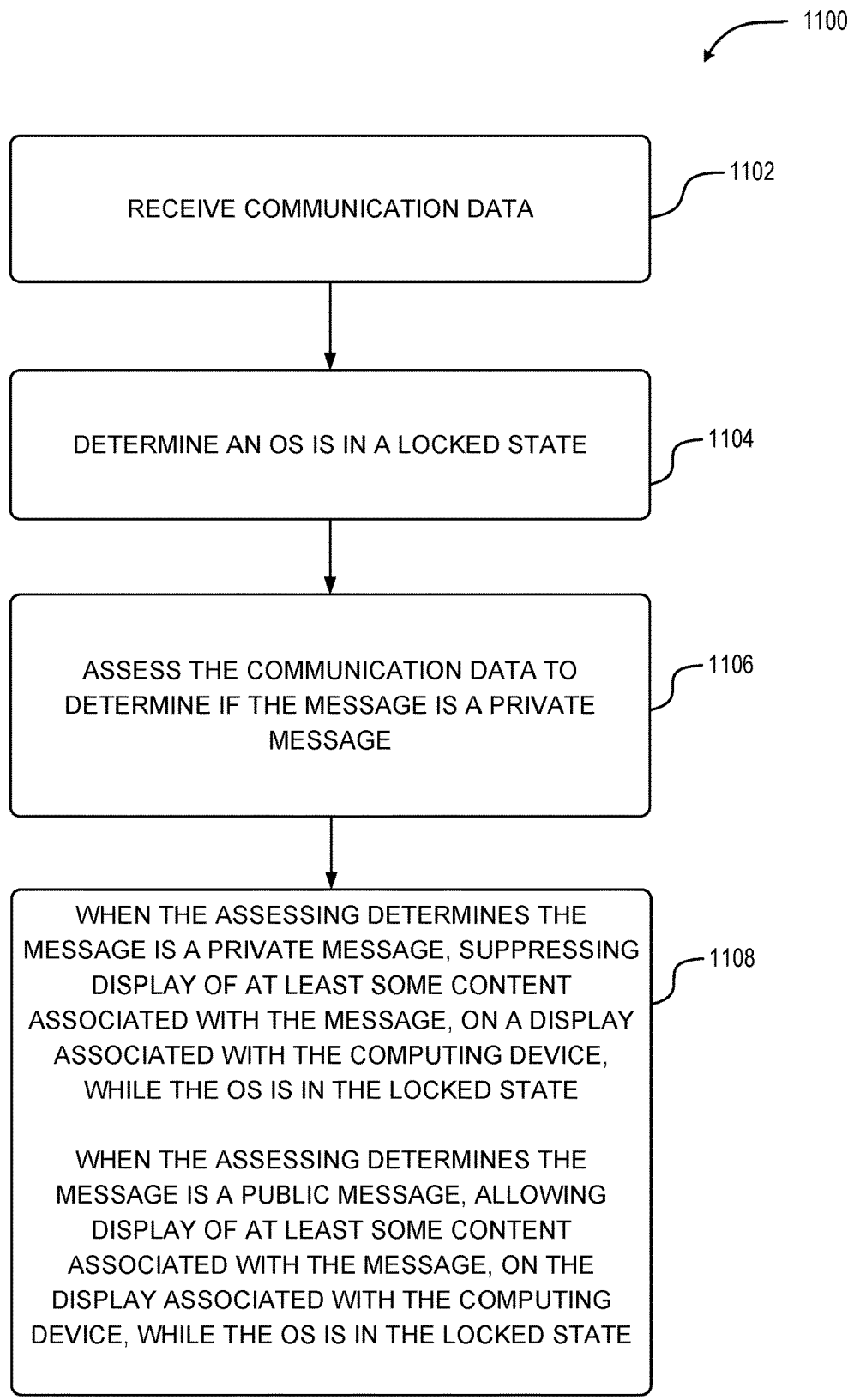
FIG. 11 illustrates a flow chart diagram relating to operations associated with the sensitive content determination techniques.

FIG. 11 is a diagram of an example flowchart 1100 that illustrates operations associated with identification of sensitive content associated with communication data. In some implementations, the operations of FIG. 11 can be performed by components of one or more computing devices, such one or more of the devices 104 and/or the server platform 102. Therefore, the instructions associated with the example flowchart 1100 may be executed by one or more processors associated with server-side components (e.g., the server platform 102) and/or client-side components (one or more of the devices 104).

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system (e.g., the system 100, the device(s) 104 and/or, the server platform 102) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof. Furthermore, the logical operations described herein may be implemented by a single computing device, such as a client device or a server device. Alternatively, the logical operations described herein may be implemented by a combination of server devices and client devices.

The flowchart 1100 may begin at operation 1102, where communication data including at least text, such as a message, is received by a computing device (e.g., the device 104).

At operation 1104, the computing device determines that an OS associated therewith is in a locked state. The locked state of the OS prevents use of one or more features associated with the OS in the absence of a successful authentication procedure associated with the OS.

At operation 1106, the communication data is analyzed to determine if the message associated with the communication data contains sensitive content. Specifically, a device can analyze an identifier 172 and/or content 174 of a message 170 to determine if the message 170 associated with the communication data includes sensitive content. For illustrative purposes, some content may be deemed as sensitive content that should only be consumed by an authorized user. For example, sensitive content can include any data that is communicated as part of a multi-factor authentication process. Sensitive content can also include any information that is deemed to be private in a user setting 178.

The operation 1106 may include (1) analyzing the communication data to determine if prior communication interaction with a sender of the message occurred, (2) analyzing the communication data to determine if the sender of the message has a contact entry in a contact list associated with the computing device, and/or (3) analyzing the communication data to determine if the communication data includes at least one of one or more predetermined keywords and one or more predetermined identifiers.

At operation 1108, (1) when the assessing determines the message is a private message (e.g., the message includes sensitive content), suppressing display of at least some content associated with the message, on a display device associated with the computing device, while the OS is in the locked state, and (2) when the assessing determines the message is a public message (e.g., the message is deemed not to include sensitive content), allowing display of at least some content associated with the message, on the display device associated with the computing device, while the OS is in the locked state.

In some implementations, one or more of the operations 1102-1108 are performed as a computer background process that is insulated or hidden from a user. Specifically, the operations 1102-1108 may be performed autonomously by an operating system, such as the MICROSOFT WINDOWS operating system, software application, and so forth.

Figure 12:
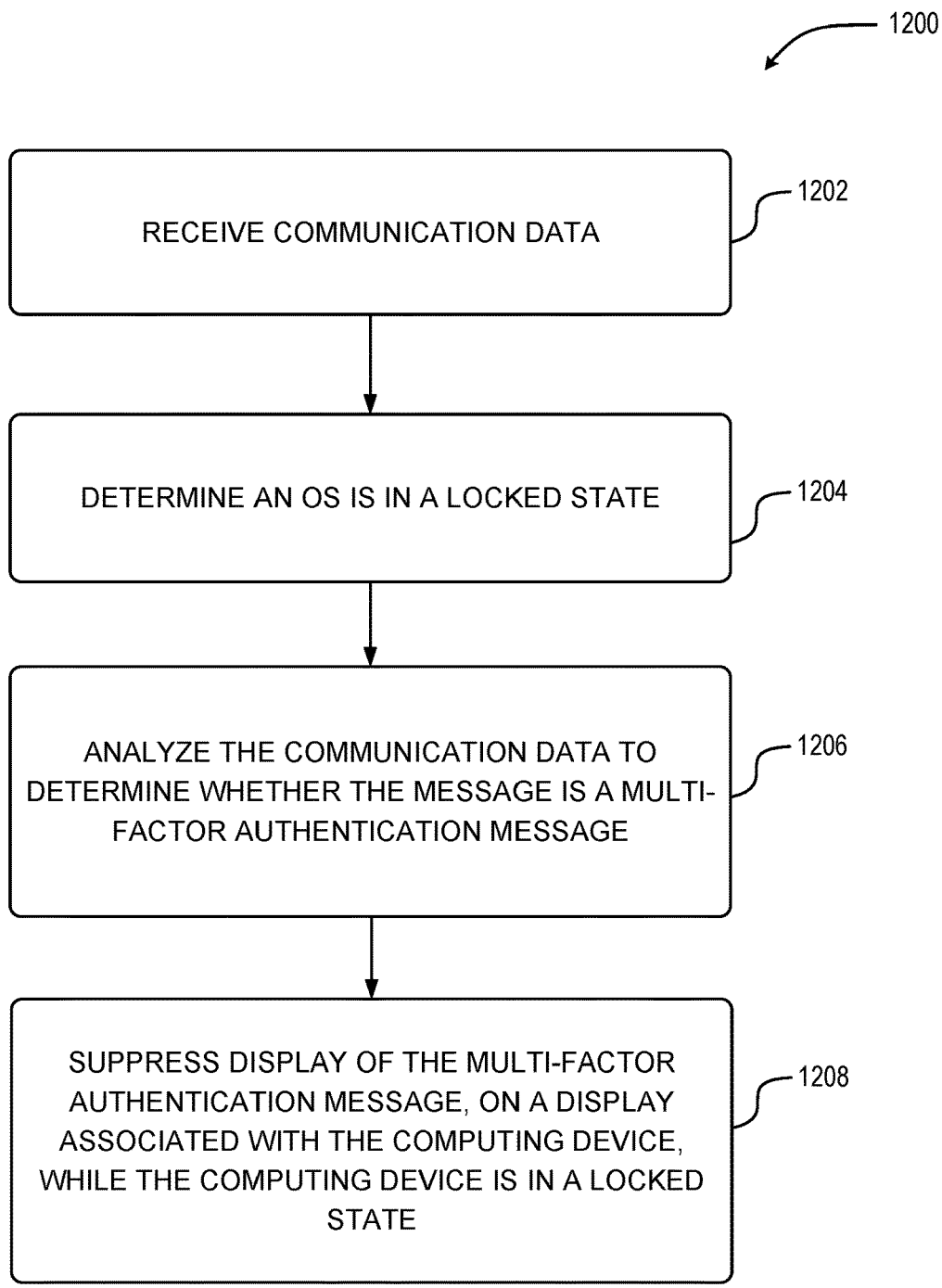
FIG. 12 illustrates an additional a flow chart diagram relating to operations associated with the sensitive content determination techniques.

FIG. 12 is a diagram of an example flowchart 1200 that illustrates operations associated with identification of sensitive content associated with communication data. In some implementations, the operations of FIG. 12 can be performed by components of one or more computing devices, such one or more of the devices 104 and/or the server platform 102. Therefore, the instructions associated with the example flowchart 1200 may be executed by one or more processors associated with server-side components (e.g., the server platform 102) and/or client-side components (one or more of the devices 104).

The flowchart 1200 may begin at operation 1202, where communication data including at least text, such as a message, is received by a computing device (e.g., the device 104).

At operation 1204, the computing device determines that an OS associated therewith is in a locked state. The locked state of the OS prevents use of one or more features associated with the OS in the absence of a successful authentication procedure associated with the OS.

At operation 1206, the communication data is analyzed or assessed to determine if the message associated with the communication data is a multi-factor authentication message.

At operation 1208, when the assessment determines the message is a multi-factor authentication message, suppressing display of the message, on a display device associated with the computing device, while the computing device is in a locked state.

In some implementations, one or more of the operations 1202-1208 are performed as a computer background process that is insulated or hidden from a user. Specifically, the operations 1202-1208 may be performed autonomously by an operating system, such as the MICROSOFT WINDOWS operating system, software application, and so forth.

Figure 13:
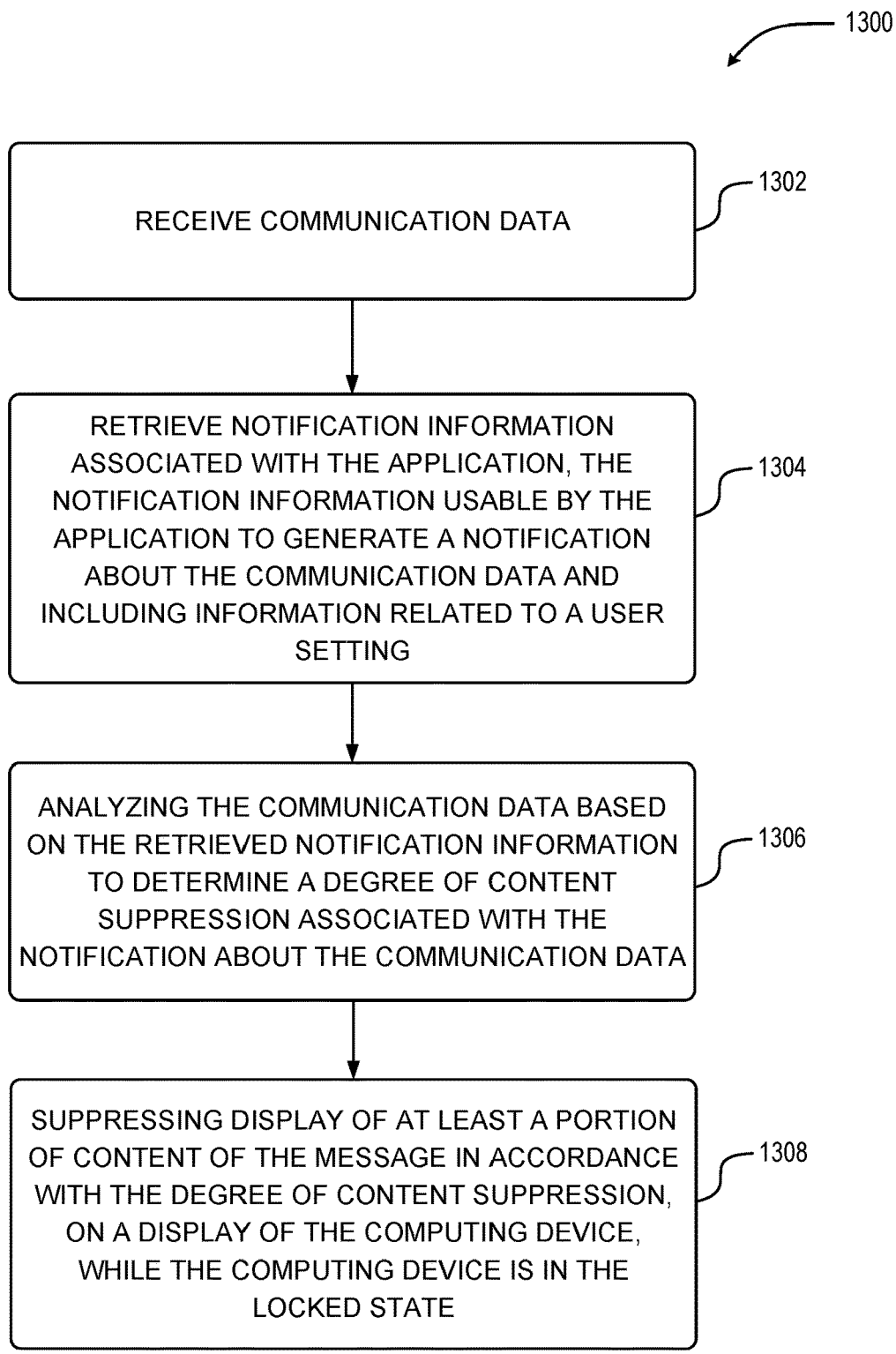
FIG. 13 illustrates another flow chart diagram relating to operations associated with the sensitive content determination techniques.

FIG. 13 is a diagram of an example flowchart 1300 that illustrates operations associated with identification of sensitive content associated with communication data. In some implementations, the operations of FIG. 13 can be performed by components of one or more computing devices, such one or more of the devices 104 and/or the server platform 102. Therefore, the instructions associated with the example flowchart 1300 may be executed by one or more processors associated with server-side components (e.g., the server platform 102) and/or client-side components (one or more of the devices 104).

The flowchart 1300 may begin at operation 1302, where communication data including at least text, such as a message, is received by a computing device (e.g., the device 104). In some implementations, an application, such as an OS or end user software application, receives the communication data. The application may be responsible for managing the received communication data. For example, the application may analyze the communication data to determine a degree of sensitive content suppression for the received communication data. The degree of content suppression may determine an amount of content to be associated with a notification for display on a lock screen.

At operation 1304, the computing device retrieves notification information associated with the application. The notification information may be usable by the application to generate a notification about the communication data and may include information related to a user setting. The setting may indicate a degree of content suppression for the notification. The degree of content suppression may be a user setting selectable via the application. In addition, or alternatively, the degree of content suppression may be set by the computing device. The computing device may provide a number of selectable degrees of content suppression. The number of selectable degrees of content suppression may be selectable by a user or the computing device.

At operation 1306, the computing device analyzes the communication data based on the retrieved notification information. The computing device determines a degree of suppression to be used with the notification that is generated in response to receiving communication data. In some embodiments, the degree of suppression may be selected from a plurality of user-selectable degrees of suppression. For example, a user setting can define a number of degrees of suppression, and a device can select one of those options. In some embodiments, the degree of suppression may be selected from a plurality of machine-selectable degrees of suppression. For example, a device can analyze a message, one or more user settings, and/or other historical information to select a degree of suppression.

The operation 1306 may also include (1) analyzing the communication data to determine if prior communication interaction with a sender of the message occurred, (2) analyzing the communication data to determine if the sender of the message has a contact entry in a contact list associated with the computing device, and/or (3) analyzing the communication data to determine if the communication data includes at least one of one or more predetermined keywords and one or more predetermined identifiers.

At operation 1308, the computing device suppresses display of at least a portion of content 174 associated with the message 170 on a display device (also referred to herein as a "display screen") while the computing device is in a locked state. In some embodiments, the device can suppress the display of at least a portion of content 174 and/or an identifier 172 of the message 170 in accordance with the degree of suppression. For illustrative purposes, a degree of suppression is also referred to herein as a "degree of sensitive content suppression" or a "degree of content suppression." The degree of suppression may be used by the computing device to take one or more actions, which may involve the display of content 174 that is not deemed as sensitive, while suppressing the display of content 174 or portions of content 174 that are deemed to be sensitive.

In some implementations, one or more of the operations 1302-1308 are performed as a computer background process that is insulated or hidden from a user. Specifically, the operations 1302-1308 may be performed autonomously by an operating system, such as the MICROSOFT WINDOWS operating system, software application, and so forth.

Figure 14:
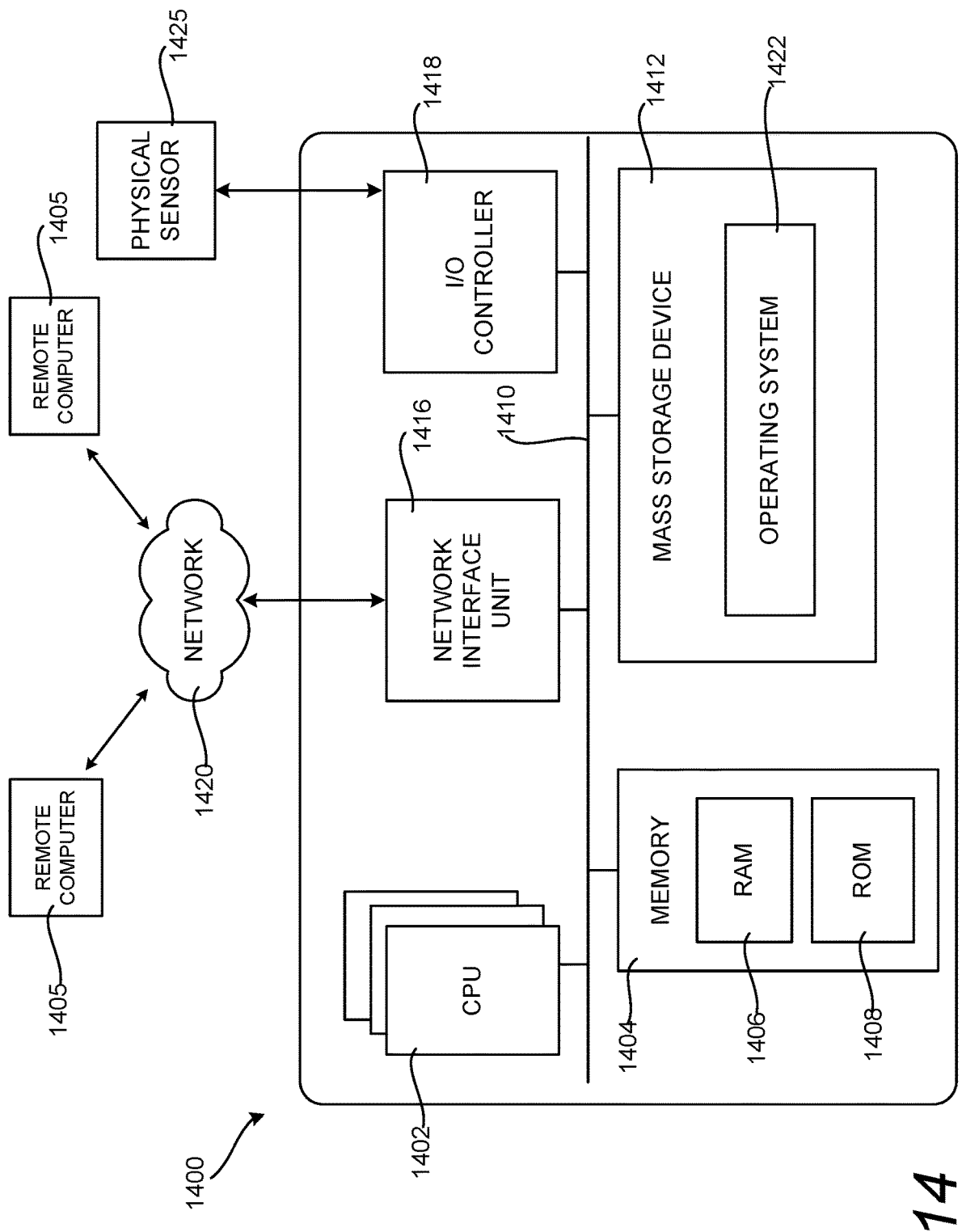
FIG. 14 is a computer architecture diagram showing an illustrative computer hardware and software architecture for a computing device that can implement aspects of the technologies presented herein.

FIG. 14 is a computer architecture diagram showing an illustrative computer hardware and software architecture for a computing device 1400 that can implement the various technologies presented herein. In particular, the architecture illustrated in FIG. 14 can be utilized to implement a server computer, mobile phone, an e-reader, a smartphone, a desktop computer, an AR/VR device, a tablet computer, a laptop computer, or another type of computing device. In some implementations, the devices 104 and the server platform 102 implement some or all of the elements and functionalities associated with the computing device 1400.

The computer 1400 illustrated in FIG. 14 includes a central processing unit 1402 ("CPU"), a system memory 1404, including a random-access memory 1406 ("RAM") and a read-only memory ("ROM") 1408, and a system bus 1410 that couples the memory 1404 to the CPU 1402. A basic input/output system ("BIOS" or "firmware") containing the basic routines that help to transfer information between elements within the computer 1400, such as during startup, can be stored in the ROM 1408. The computer 1400 further includes a mass storage device 1412 for storing an operating system 1422, application programs, and other types of programs. The mass storage device 1412 can also be configured to store other types of programs and data.

The mass storage device 1412 is connected to the CPU 1402 through a mass storage controller (not shown on FIG. 14) connected to the bus 1410. The mass storage device 1412 and its associated computer readable media provide non-volatile storage for the computer 1400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 1400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 1400. For purposes of the claims, the phrase "computer storage medium," and variations thereof, does not include waves or signals per se or communication media.

According to various configurations, the computer 1400 can operate in a networked environment using logical connections to remote computers through a network such as the network 1420. In some implementations, the network 106 provides at least some or all of the same functionalities as the network 1420. The computer 1400 can connect to the network 1420 through a network interface unit 1416 connected to the bus 1410. It should be appreciated that the network interface unit 1416 can also be utilized to connect to other types of networks and remote computer systems. The computer 1400 can also include an input/output controller 1418 for receiving and processing input from a number of other devices, including a keyboard, mouse, touch input, an electronic stylus (not shown in FIG. 14), or a physical sensor such as a video camera. Similarly, the input/output controller 1418 can provide output to a display screen or other type of output device (also not shown in FIG. 14).

It should be appreciated that the software components described herein, when loaded into the CPU 1402 and executed, can transform the CPU 1402 and the overall computer 1400 from a general-purpose computing device into a special-purpose computing device customized to facilitate the functionality presented herein. The CPU 1402 can be constructed from any number of transistors or other discrete circuit elements, which can individually or collectively assume any number of states. More specifically, the CPU 1402 can operate as a finite-state machine, in response to executable instructions contained within the software modules disclosed herein. These computer-executable instructions can transform the CPU 1402 by specifying how the CPU 1402 transitions between states, thereby transforming the transistors or other discrete hardware elements constituting the CPU 1402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 1400 in order to store and execute the software components presented herein. It also should be appreciated that the architecture shown in FIG. 14 for the computer 1400, or a similar architecture, can be utilized to implement other types of computing devices, including hand-held computers, video game devices, embedded computer systems, mobile devices such as smartphones, tablets, and AR/VR devices, and other types of computing devices known to those skilled in the art. It is also contemplated that the computer 1400 might not include all of the components shown in FIG. 14, can include other components that are not explicitly shown in FIG. 14, or can utilize an architecture completely different than that shown in FIG. 14.

Figure 15:
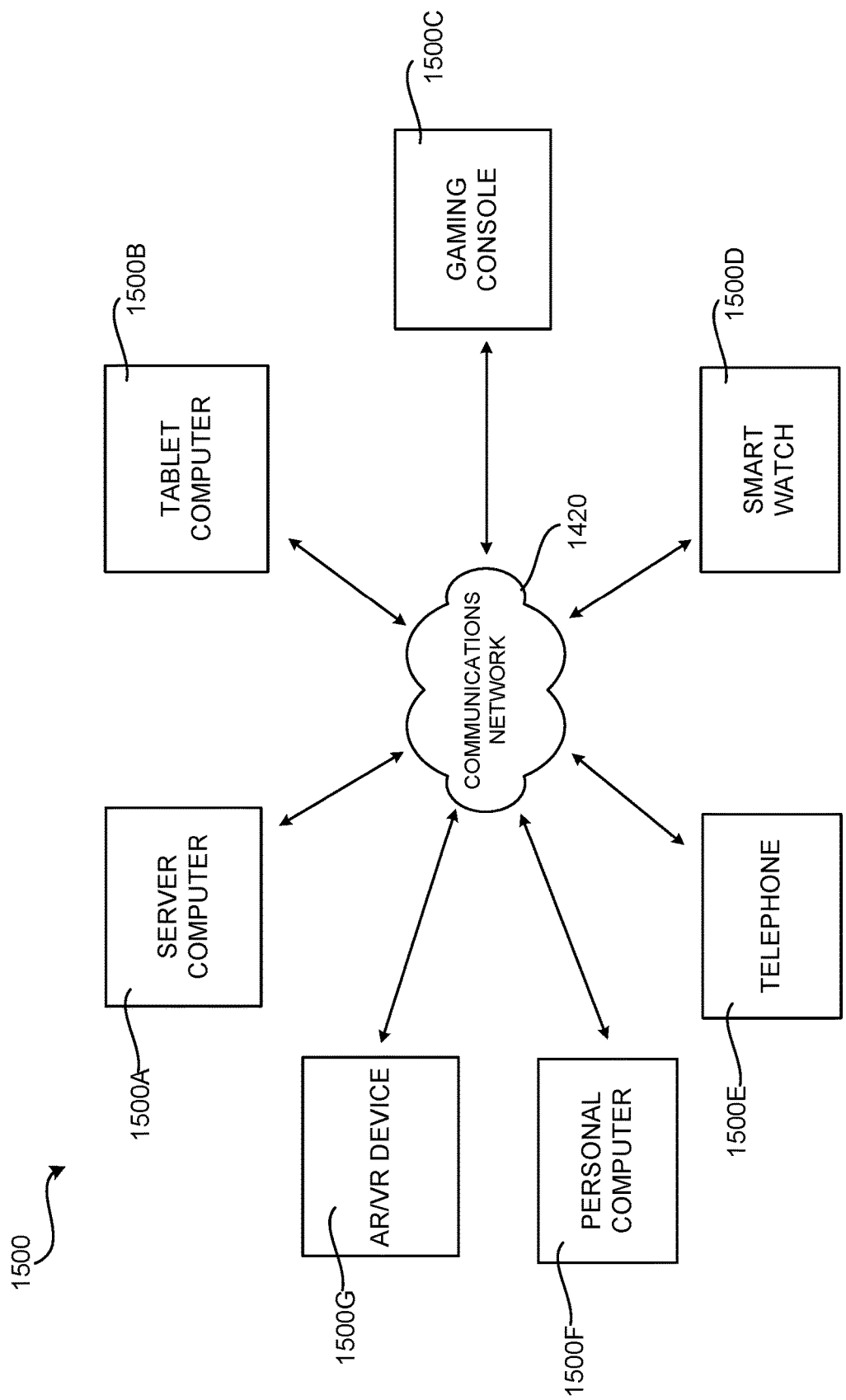
FIG. 15 is a network diagram illustrating a distributed computing environment in which aspects of the disclosed technologies can be implemented.

FIG. 15 is a network diagram illustrating a distributed network computing environment 1500 in which aspects of the disclosed technologies can be implemented, according to various embodiments presented herein. The server platform provider 102 may implement the distributed network computing environment 1500 to provide distributed storage, via one or more distributed physical or virtual storages associated with one or more computing devices.

As shown in FIG. 15, one or more server computers 1500A can be interconnected via a communications network 1420 (which may be either of, or a combination of, a fixed-wire or wireless LAN, WAN, intranet, extranet, peer-to-peer network, virtual private network, the Internet, Bluetooth communications network, proprietary low voltage communications network, or other communications network) with a number of devices such as, but not limited to, a tablet computer 1500B, a gaming console 1500C, a smart watch 1500D, a telephone 1500E, such as a smartphone, a personal computer 1500F, and an AR/VR device 1500G.

In a network environment in which the communications network 1420 is the Internet, for example, the server computer 1500A can be a dedicated server computer operable to process and communicate data to and from the devices 1500B-1500G via any of a number of known protocols, such as, hypertext transfer protocol ("HTTP"), file transfer protocol ("FTP"), or simple object access protocol ("SOAP"). Additionally, the networked computing environment 1500 can utilize various data security protocols such as secured socket layer ("SSL") or pretty good privacy ("PGP"). Each of the devices 1500B-1500G can be equipped with an operating system operable to support one or more computing applications or terminal sessions such as a web browser (not shown in FIG. 15), or other graphical user interface (not shown in FIG. 15), or a mobile desktop environment (not shown in FIG. 15) to gain access to the server computer 1500A.

The server computer 1500A can be communicatively coupled to other computing environments (not shown in FIG. 15) and receive data regarding a participating user's interactions/resource network. In an illustrative operation, a user (not shown in FIG. 15) may interact with a computing application running on a device 1500B-1500G to obtain desired data and/or perform other computing applications.

The data and/or computing applications may be stored on the server 1500A, or servers 1500A, and communicated to cooperating users through the devices 1500B-1500G over an exemplary communications network 1420. A participating user (not shown in FIG. 15) may request access to specific data and applications housed in whole or in part on the server computer 1500A. These data may be communicated between the devices 1500B-1500G and the server computer 1500A for processing and storage.

The server computer 1500A can host computing applications, processes and applets for the generation, authentication, encryption, and communication of data and applications, and may cooperate with other server computing environments (not shown in FIG. 15), third party service providers (not shown in FIG. 15), network attached storage ("NAS") and storage area networks ("SAN") to realize application/data transactions.

It should be appreciated that the computing architecture shown in FIG. 14 and the distributed network computing environment shown in FIG. 15 have been simplified for ease of discussion. It should also be appreciated that the computing architecture and the distributed computing network can include and utilize many more computing components, devices, software programs, networking devices, and other components not specifically described herein.

EXAMPLE CLAUSES

The disclosure presented herein encompasses the subject matter set forth in the following clauses.

Clause 1. A method for suppressing message content received by a computing device in a locked state, the method comprising: receiving communication data comprising a message associated with an application for managing the communication data; retrieving notification information associated with the application, the notification information usable by the application to generate a notification about the communication data and including information related to a user setting; analyzing the communication data based on the retrieved notification information to determine a degree of content suppression associated with the notification about the communication data; and in response to determining the degree of content suppression associated with the notification about the communication data, suppressing a display of at least a portion of content of the message in accordance with the degree of content suppression, on a display screen of the computing device, while the computing device is in the locked state.

Clause 2. The method according to clause 1, wherein the information related to the user setting comprises user settable notification information defining the degree of content suppression for the application managing the communication data.

Clause 3. The method according to clause 2, wherein the degree of content suppression is associated with a plurality of user selectable notification settings for the application, each of the plurality of user selectable notification settings defining a unique degree of content suppression for communication data associated with the application.

Clause 4. The method according to at least one of clauses 1-3, wherein the degree of content suppression is associated with a plurality of content suppression settings including a first content suppression setting to suppress all content associated with the message when the message includes sensitive content, a second content suppression setting to suppress only the sensitive content when the message includes the sensitive content, and a third content suppression setting to suppress the communication data and all content associated with the message when the message includes sensitive content.

Clause 5. The method according to at least one of clauses 1-3, wherein the analyzing of the communication data comprises at least one of analyzing the communication data to determine if an identifier of a sender of the message is in a contact list, and analyzing the communication data to determine if the message includes predetermined alphanumeric data.

Clause 6. The method according to clause 5, wherein the analyzing the communication data to determine if the identifier of the sender of the message is in the contact list determines the identifier is not in the contact list, and the suppressing display of at least a portion of content of the message in accordance with the degree of content suppression comprises displaying the notification about the communication data including only an indicator that the communication data comprising the message was received by the computing device.

Clause 7. The method according to clause 5, wherein the analyzing the communication data to determine if the message includes predetermined alphanumeric data determines at least one keyword associated with the predetermined alphanumeric data is included in the message, and the suppressing display of at least a portion of content of the message in accordance with the degree of content suppression comprises displaying the notification about the communication data including content from the message that is devoid of the at least one keyword.

Clause 8. The method according to at least one of clauses 1-7, further comprising: while the computing device is in the locked state, displaying the notification about the communication data on the display screen of the computing device; detecting a successful authentication procedure to unlock the computing device; and in response to the successful authentication procedure, unlocking the computing device and displaying the communication data comprising the message in association with the application for managing the communication data.

Clause 9. A method for suppressing message content received by a computing device in a locked state, the method comprising: receiving communication data comprising a message; determining an operating system (OS) associated with the computing device is in a locked state, the locked state of the OS preventing use of one or more features associated with the OS in the absence of a successful authentication procedure associated with the OS; analyzing the communication data to determine the message is a multi-factor authentication message; and suppressing display of the message, on a display screen associated with the computing device, while the computing device is in a locked state.

Clause 10. The computing device implemented method according to clause 9, wherein the communication data further comprises a sequence of number digits, and the analyzing the communication data comprises analyzing the sequence of number digits to determine the message is a multi-factor authentication message.

Clause 11. The computing device implemented method according to clause 10, wherein the sequence of number digits is a phone number associated with a sender of the communication data comprising the message, and the analyzing the sequence of number digits comprises determining the phone number comprises a sequence of number digits less than or greater than a predetermined number of digits.

Clause 12. The computing device implemented method according to clause 9, wherein the analyzing the communication data comprises determining the message includes at least one of a plurality of predetermined privacy terms.

Clause 13. The computing device implemented method according to clause 12, wherein the plurality of predetermined privacy terms are stored in a machine learning storage coupled to a machine learning module, the machine learning module augmenting the plurality of predetermined privacy terms stored in the machine learning storage using a crowdsourcing function that receives terms from multiple sources.

Clause 14. The computing device implemented method according to at least one of clauses 9-13, further comprising displaying, on the display screen associated with the computing device, a notification that the communication data comprising the message was received by the computing device.

Clause 15. A computing device, comprising: a processor; a computer-readable storage medium in communication with the processor, the computer-readable storage medium having computer-executable instructions stored thereupon which, when executed by the processor, cause the processor to: determine if the computing device is in a locked state, the locked state preventing use of one or more features associated with the computing device in the absence of a successful authentication procedure associated with the computing device; and analyze communication data comprising a message to determine if the message includes sensitive content, in response to determining if the message includes sensitive content, suppressing display of at least a portion of the message on a display screen associated with the computing device while the computing device is in the locked state.

Clause 16. The computing device according to clause 15, wherein the analysis of the communication data comprising the message comprises analyzing the communication data to determine if prior communication interaction with a sender of the message occurred, the analyzing comprising determining if an outgoing message communication history associated with the computing device includes an outgoing message including contact information associated with the sender.

Clause 17. The computing device according to clause 16, wherein the computer-executable instructions, when executed by the processor, further cause the processor to determine the message does not include sensitive content when the outgoing message communication history associated with the computing device includes the outgoing message including the contact information associated with the sender.

Clause 18. The computing device implemented method according to at least one of clauses 15-17, wherein the computer-executable instructions, when executed by the processor, further cause the processor to: analyze the communication data to determine if contact information for a sender of the message is referenced in a contact list associated with the computing device and the reference to the contact information includes a privacy indicator set to private, and determine that the message includes sensitive content when the privacy indicator is set to private.

Clause 19. The computing device according to at least one of clauses 15-18, wherein the suppressing display of at least the portion of the content associated with the message includes retrieving notification information to generate a notification about the communication data, the notification information defining a degree of content suppression associated with the notification about the communication data.

Clause 20. The computing device according to clause 19, wherein the degree of content suppression is associated with a plurality of selectable notification settings for the application, each of the plurality of user selectable notification settings defining a unique degree of content suppression for the communication data.

Clause 21. The method according to clause 1, wherein the information related to the user setting comprises user-selectable notification information defining the degree of content suppression for the application managing the communication data.

Clause 22. The method according to at least one of clauses 1 and 21, wherein the degree of content suppression is selected from with a plurality of user-selectable notification settings for the application, each of the plurality of user selectable notification settings defining a unique definition of an amount of the message content that is suppressed.

Clause 23. The method according to at least one of clauses 1, 21 and 22, wherein the degree of content suppression is selected from one or more degrees of content suppression including a first degree of content suppression to suppress all content associated with the message when the message includes sensitive content, a second degree of content suppression to suppress only the sensitive content when the message includes the sensitive content, and a third degree of content suppression to suppress the communication data and all content associated with the message when the message includes sensitive content.

Clause 24. The method according to at least one of clauses 1 and 21-23, wherein analyzing the communication data comprises at least one of analyzing the communication data to determine if an identifier of a sender of the message is in a contact list, or analyzing the communication data to determine if the message includes predetermined alphanumeric data.

Clause 25. The method according to clause 24, wherein analyzing the communication data to determine if the identifier of the sender of the message is in the contact list determines the identifier is not in the contact list, and wherein suppressing the display of at least a portion of content of the message in accordance with the degree of content suppression comprises displaying the notification only includes an indicator that the communication data was received by the computing device.

Although the techniques have been described in language specific to structural features and/or methodological acts, it is to be understood that the appended claims are not necessarily limited to the features or acts described. Rather, the features and acts are described as example implementations of such techniques.

The technologies described herein address the technical need to provide an improved lock screen for computing devices. Specifically, at least some of the described implementations provide technologies to suppress display of sensitive information on a lock screen associated with a computing device.

The described technologies that suppress display of sensitive information on the lock screen associated with the computing device reduce consumption of a processor's resources associated with the computing device by suppressing unnecessary and undesirable display of the sensitive information on the lock screen. In addition, the described technologies that suppress display of sensitive information on the lock screen may reduce consumption of battery power by suppressing unnecessary and undesirable display of the sensitive information on the lock screen.

In some implementations, a device can work in concert with other services to identify sensitive content. The services may include a server device, such as one or more server devices associated with a distributed computing environment. The device and the systems can perform the analysis by scanning communication data for one or more predetermined terms or phrases.

Alternatively, or in addition, the analysis may include determining the existence of sensitive content, or lack thereof, by scanning communication data for one or more privacy indicators, such as an enabled privacy flag associated with a text message or email.

Alternatively, or in addition, the analysis may include determining the existence of sensitive content, or lack thereof, by comparing information associated with a sender of the communication data, such as an email address or telephone number, to a contact list that includes contact information, such as email addresses and/or telephone numbers.

Alternatively, or in addition, the analysis may include determining the existence of sensitive content, or lack thereof, by comparing information associated with a sender of the communication data, such as an email address or telephone number, to communication history. Communication history information may include a list of email addresses, telephone numbers, and the like, used in prior communication sessions associated with the computing device.

In some implementations, machine learning techniques may be used to establish or augment privacy data that may be used in determining when communication data comprises sensitive content.

In some implementations, an operating system (OS) and/or applications associated with the OS may process data, such as messages, email, notifications, and the like, for consumption by a user of a computing device associated with the OS or applications. Some of the content provided or generated by the OS or applications may be sensitive content associated with private messages that should only be consumed by an authorized user of the computing device. The OS and/or application generating or supplying the content may function to suppress display of the content when the analysis of the content determines that the content contains sensitive content that should only be consumed by an authorized user of the computing device.

For example, the OS and/or one or more applications associated with the OS may include functionality that suppresses the display of content including sensitive information on the lock screen that may be displayed on the display device of the computing device. In particular, the OS and/or one or more applications may suppress lock screen display of notifications associated with sensitive content found in text messages, email, and/or other text that may be generated by the OS and/or one or more applications associated with the OS.

In some implementations, the OS and/or one or more applications associated with a computing device analyzes communication data, text messages, email, and/or other data, that may be generated by the OS and/or one or more applications associated with the OS, for private content. When private content is determined or found, the OS and/or one or more applications suppresses display of the private content on the lock screen. In some implementations, a notification associated with the private content is not generated and displayed on the lock screen. Alternatively, in some implementations, when the analysis of the communication data, text messages, email, and/or text identifies the presence of sensitive content, a filtered notification for display on the lock screen is generated by the OS and/or one or more applications. However, the filtered notification is devoid of the sensitive content.

The described communication data may be associated with private messages or public messages. The implementations described herein are functional to identify when the communication data is associated with private messages or public messages. In some implementations, notifications associated with private messages may be suppressed from being displayed on a lock screen. Alternatively, in some implementations, notifications associated with private messages may be generated to include communication data that is devoid of sensitive content.

In some implementations, analysis for determining the existence of sensitive content can be performed by a computing device, such as a mobile phone, and/or a server device, such as one or more server devices associated with a distributed computing environment. The analysis may include determining the existence of sensitive content by scanning communication data for one or more predetermined terms or phrases. In such embodiments, the analysis for determining the presence of sensitive content may include scanning communication data for one or more privacy indicators, such as an enabled privacy flag associated with a text message or email. Alternatively, or in addition, the analysis for determining the existence of sensitive content may include comparing information associated with a sender of the communication data, such as an email address or telephone number, to a contact list that includes contact information, such as email addresses and/or telephone numbers.

The analysis may include determining the existence of sensitive content, or lack thereof, by comparing information associated with a sender of the communication data, such as an email address or telephone number, to historical communication information. Such data may include, but is not limited to, a list of email addresses, telephone numbers, and the like, used in prior communication sessions associated with the computing device.

In some implementations, the machine learning techniques may be used to for determine the existence of sensitive content. In such embodiments, a machine learning module may generate or modify privacy data that may be used in determining when communication data comprises sensitive content.

In some implementations, a computing device implemented method is provided. The method may include receiving communication data comprising a message, and determining an OS associated with the computing device is in a locked state, the locked state of the OS preventing use of one or more features associated with the OS in the absence of a successful authentication procedure associated with the OS. Furthermore, the method may include assessing the communication data to determine if the message is a private message or a public message, the assessing comprising at least one of, (1) analyzing the communication data to determine if prior communication interaction with a sender of the message occurred, (2) analyzing the communication data to determine if the sender of the message has a contact entry in a contact list associated with the computing device, and (3) analyzing the communication data to determine if the communication data includes at least one of one or more predetermined keywords and one or more predetermined identifiers. When the assessing determines the message is a private message, the method may suppress display of at least some content associated with the message, on a display device associated with the computing device, while the OS is in the locked state, and when the assessing determines the message is a public message, the method may allow display of at least some content associated with the message, on the display device associated with the computing device, while the OS is in the locked state.

In some implementations, a computing device implemented method is provided that includes receiving communication data comprising a message, and determining an OS associated with the computing device is in a locked state, the locked state of the OS preventing use of one or more features associated with the OS in the absence of a successful authentication procedure associated with the OS. The method further may include analyzing the communication data to determine the message is a multi-factor authentication message, and suppressing display of the message, on a display device associated with the computing device, while the computing device is in a locked state.

Furthermore, in some implementations, a computing device may include a processor and a computer-readable storage medium in communication with the processor, the computer-readable storage medium having computer-executable instructions stored thereupon. The instructions, when executed by the processor, cause the processor to determine an OS associated with the computing device is in a locked state, the locked state of the OS preventing use of one or more features associated with the OS in the absence of a successful authentication procedure associated with the OS. Furthermore, the instructions, when executed by the processor, may case the processor to analyze communication data comprising a message, the communication data comprising the message for communication to a remote computing device, to determine if the message is a private message or a public message. When the analysis determines the message is a private message, the device may suppress display of at least some content associated with the message, on a display device associated with the computing device, while the OS is in the locked state, and when the analysis determines the message is a public message, the device may allow display of at least some content associated with the message, on the display device associated with the computing device, while the OS is in the locked state.

It should be appreciated that the above-described subject matter may be implemented as a computer-controlled apparatus, a computer process, a computing system, or as an article of manufacture such as a computer-readable storage medium. Among many other benefits, the techniques disclosed herein improve efficiencies with respect to a wide range of computing resources. For instance, human interaction with devices and systems may be improved as a result of the use of the techniques disclosed herein enable users and individuals to remotely manipulate rendered streams within a graphical environment associated with a communication session to better reflect their interactions in the communication session. Other technical effects other than those mentioned herein can also be realized from implementations of the technologies disclosed herein.

The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method for selectively suppressing display of message content that is received by a computing device in a locked state, the method comprising:
    receiving communication data that includes a message for display at the computing device;
    retrieving notification information associated with an application for managing the communication data, wherein the notification information defines a user setting that associates a particular content type with a degree of content suppression of a plurality of degrees of content suppression that are usable by the application to generate a notification about the communication data;
    analyzing the communication data based on the notification information to determine whether a portion of the message corresponds to the particular content type; and
    in response to determining that the portion of the message corresponds to the particular content type, suppressing display of at least the portion of the message, within the notification about the communication data, in accordance with the degree of content suppression, on a display screen of the computing device while the computing device is in the locked state.

2. The method according to claim 1, wherein the user setting is associated with user-selectable notification information defining the degree of content suppression for the application managing the communication data.

3. The method according to claim 1, wherein the degree of content suppression is selected from a plurality of user-selectable notification settings for the application, individual user-selectable notification settings, of the plurality of user-selectable notification settings, defining a unique definition of an amount of the message content that is suppressed.

4. The method according to claim 1, wherein the plurality of degrees of content suppression include a first degree of content suppression to suppress all content associated with the message when the message includes sensitive content, a second degree of content suppression to selectively suppress the sensitive content when the message includes the sensitive content, and a third degree of content suppression to suppress the communication data and all content associated with the message when the message includes sensitive content.

5. The method according to claim 1, wherein analyzing the communication data comprises at least one of:

determining if an identifier of a sender of the message is in a contact list, or determining if the message includes predetermined alphanumeric data.

6. The method according to claim 5, wherein determining if the identifier of the sender of the message is in the contact list includes determining that the identifier is not in the contact list, and wherein suppressing the display of at least the portion of the message in accordance with the degree of content suppression comprises displaying an indicator that the communication data was received by the computing device while refraining from displaying the portion of the message that corresponds to the particular content type so long as the computing device remains in the locked state.

7. The method according to claim 5, wherein determining if the message includes the predetermined alphanumeric data includes determining that at least one keyword associated with the predetermined alphanumeric data is included in the message, and wherein suppressing the display of at least the portion of the message in accordance with the degree of content suppression comprises selectively displaying other portions of the message that are devoid of the at least one keyword.

8. The method according to claim 1, further comprising:
while the computing device is in the locked state, displaying the notification about the communication data on the display screen of the computing device;
detecting a successful authentication procedure to unlock the computing device; and
in response to the successful authentication procedure, unlocking the computing device and displaying the communication data comprising the message in association with the application for managing the communication data.

9. A method for suppressing message content received by a computing device in a locked state, the method comprising:
receiving communication data comprising a message;
determining an operating system (OS) associated with the computing device is in a locked state, the locked state of the OS preventing use of one or more features associated with the OS in the absence of a successful authentication procedure associated with the OS;
analyzing the communication data to determine the message is a multi-factor authentication message; and
suppressing display of the message, on a display screen associated with the computing device, while the computing device is in a locked state.

10. The computing device implemented method according to claim 9, wherein the communication data further comprises a sequence of number digits, and the analyzing the communication data comprises analyzing the sequence of number digits to determine the message is a multi-factor authentication message.

11. The computing device implemented method according to claim 10, wherein the sequence of number digits is a phone number associated with a sender of the communication data comprising the message, and the analyzing the sequence of number digits comprises determining the phone number comprises a sequence of number digits less than or greater than a predetermined number of digits.

12. The computing device implemented method according to claim 9, wherein the analyzing the communication data comprises determining the message includes at least one of a plurality of predetermined privacy terms.

13. The computing device implemented method according to claim 12, wherein the plurality of predetermined privacy terms are stored in a machine learning storage coupled to a machine learning module, the machine learning module augmenting the plurality of predetermined privacy terms stored in the machine learning storage using a crowdsourcing function that receives terms from multiple sources.

14. The computing device implemented method according to claim 9, further comprising displaying, on the display screen associated with the computing device, a notification that the communication data comprising the message was received by the computing device.

15. A computing device, comprising:
a processor;
a computer-readable storage medium in communication with the processor, the computer-readable storage medium having computer-executable instructions stored thereupon which, when executed by the processor, cause the processor to:
receive communication data that includes a message for display at the computing device;
determine that the computing device is operating in a locked state for preventing use of one or more features associated with the computing device;
determine, based on the communication data, if the message includes a particular content type;
in response to determining that the message includes the particular content type and that the computing device is operating in the locked state, suppress display of at least a portion of the message, that corresponds to the particular content type, on a display screen associated with the computing device while the computing device is operating in the locked state;
determine that the computing device has transitioned from operating in the locked state to operating in an unlocked state, wherein transitioning to operating in the unlocked state is in response to an authentication procedure; and
based at least in part on the computing device transitioning to operating in the unlocked state, cause the display screen to display the portion of the message that corresponds to the particular content type.

16. The computing device according to claim 15, wherein the computer-executable instructions, when executed by the processor, further cause the processor to determine if prior communication interaction with a sender of the message occurred, and
determine if an outgoing message communication history associated with the computing device includes an outgoing message including contact information associated with the sender.

17. The computing device according to claim 16, wherein the computer-executable instructions, when executed by the processor, further cause the processor to determine the message does not include sensitive content when the outgoing message communication history associated with the computing device includes the outgoing message including the contact information associated with the sender.

18. The computing device implemented method according to claim 15, wherein the computer-executable instructions, when executed by the processor, further cause the processor to:
analyze the communication data to determine if contact information for a sender of the message is referenced in a contact list associated with the computing device and the reference of the contact information includes a privacy indicator set to private, and determine that the message includes the particular type of content when the privacy indicator is set to private.

19. The computing device according to claim 15, wherein suppressing display of at least the portion of the message includes retrieving notification information to generate a notification about the communication data, the notification information defining a degree of content suppression associated with the notification about the communication data.

20. The computing device according to claim 19, wherein the degree of content suppression is associated with a plurality of user selectable notification settings for the application, each of the plurality of user selectable notification settings defining a unique degree of content suppression for the communication data.

* * * * *